United States Patent
Papadopoulos et al.

(10) Patent No.: US 9,465,874 B1
(45) Date of Patent: *Oct. 11, 2016

(54) AUTHENTICATED HIERARCHICAL SET OPERATIONS AND APPLICATIONS

(71) Applicant: EMC Corporation, Hopkinton, MA (US)

(72) Inventors: Dimitrios Papadopoulos, Brighton, MA (US); Nikolaos Triandopoulos, Arlington, MA (US); Ran Canetti, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,606

(22) Filed: Apr. 27, 2015

Related U.S. Application Data

(62) Division of application No. 13/829,374, filed on Mar. 14, 2013, now Pat. No. 9,049,185.

(51) Int. Cl.
| | |
|---|---|
| *G06F 7/04* | (2006.01) |
| *G06F 17/30* | (2006.01) |
| *H04L 29/06* | (2006.01) |
| *G06F 21/62* | (2013.01) |

(52) U.S. Cl.
CPC ..... *G06F 17/30864* (2013.01); *G06F 21/6227* (2013.01); *H04L 63/123* (2013.01)

(58) Field of Classification Search
CPC .................................................. G06F 21/6227
USPC .......................................................... 726/3
See application file for complete search history.

(56) References Cited

U.S. PATENT DOCUMENTS

| | | | |
|---|---|---|---|
| 2009/0041253 A1* | 2/2009 | Chen | H04L 9/321 380/282 |
| 2011/0225429 A1 | 9/2011 | Papamanthou et al. | |
| 2012/0030468 A1 | 2/2012 | Papamanthou et al. | |

OTHER PUBLICATIONS

Papamanthou et al., Optimal Verification of Operations on Dynamic Sets, Advances in Cryptology—CRYPTO 2011, Lecture Notes in Computer Science, 6841:91-110 (2011).
Papamanthou et al., Authenticated Hash Tables, Proceedings of the 15th ACM Conference on Computer and Communications Security. pp. 437-448 (2008).
Goodrich et al., Efficient Verification of Web-Content Searching Through Authenticated Web Crawlers, Proceedings of the VLDB Endowment, vol. 5, No. 10, pp. 920-931 (2012).

\* cited by examiner

*Primary Examiner* — Longbit Chai

(57) ABSTRACT

Methods and apparatus are provided for authenticated hierarchical set operations. A third party server processes a query (possibly from a client) on data sets outsourced by a source of the data. The query comprises a hierarchical set operation between at least two of the data sets. Authenticated Set Operation techniques for flat set operations can be iteratively applied for hierarchical set operations. In addition, bilinear accumulators are extended to provide an extractable accumulation scheme comprising a primary bilinear accumulator and a secondary bilinear accumulator. The client receives (i) an encoding of an answer to the query, (ii) a verification comprising, for example, one or more of subset witnesses, completeness witnesses, and/or accumulation values, and (iii) at least one argument for at least one intersection operation, union operation and/or set difference operation.

26 Claims, 9 Drawing Sheets

FIG. 3A

Algorithm $\{\alpha(q), \Pi(q)\} \leftarrow query(q, D_h, auth(D_h), pk)$:

1. Using $D_0$ compute $\alpha(q)$ which is the answer set to query $q$, where $\alpha(q) = (x_1, ..., x_\delta)$ and $\delta := |\alpha(q)|$;
2. For each of the sets $S_i, ..., S_t$ involved in $q$, compute accumulation value $acc(S_i)$ as well as corresponding proof of correctness $\Pi_i(q)$ using $queryTree$;
3. Compute polynomial coefficients $b_0, ..., b_\delta$ s.t.
   $b_\delta s^\delta + ... + b_0 s^0 := (x_1 + s) \cdot ... \cdot (x_\delta + s)$;
4. Compute the necessary witnesses $\{(W_1, F_1), ..., (W_t, F_t)\}$ for the case of intersection and $\{w_1, ..., w_\delta, W_1, ..., W_t\}$ for the case of union.

FIG. 3B

Algorithm {accept, reject} ← *verify*(q, a(q), Π(q), pub, pk):
1. Using *verifyTree*, verify the correctness of the accumulation values $acc(S_i)$; Output reject if *verifyTree* rejects any of the values;
2. Verify correctness of $b_1,...,b_\delta$ using algorithm *certify*; Output reject if *certify* rejects;
3. Using the given witnesses, accumulation values and coefficients check a set of bilinear equalities (depending on the query type) and output accepts only if only equalites hold.

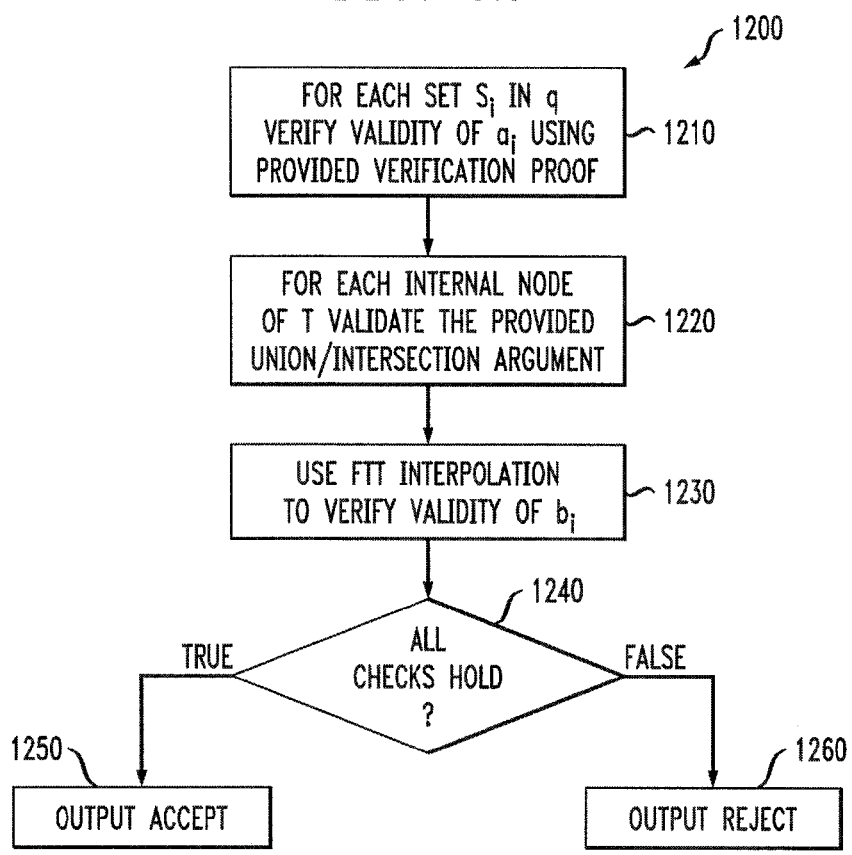

AUTHENTICATED HIERARCHICAL SET OPERATIONS AND APPLICATIONS

CROSS-REFERENCE TO RELATED APPLICATIONS

This application is a divisional of U.S. patent application Ser. No. 13/829,374 filed Mar. 14, 2013 (now U.S. Pat. No. 9,049,185), incorporated by reference herein.

STATEMENT OF GOVERNMENT RIGHTS

This invention was made, at least in part, with funding provided by The National Science Foundation under grant CNS-1012798. The United States government may have rights in this invention pursuant to Award No. 1012798.

FIELD OF THE INVENTION

The present invention relates generally to techniques for verifying data processing on outsourced data sets and, more particularly, to techniques for authenticated hierarchical set operations.

BACKGROUND

The outsourcing of computation has emerged as a common practice for enterprises and individuals, especially in the cloud setting. For example, an owner of a data set, often referred to as the source, wants to answer queries over the data set issued by one or more clients or users and, for reasons of scalability and efficiency, chooses to do so by employing a possibly untrusted server on the cloud.

An immediate by-product of outsourcing of data and computation, however, is the need for verification of the correctness of a computation. Such integrity protection is a core security goal in cloud computing. Ensuring that data contents remain intact in the lifetime of an outsourced data set and that query processing is handled correctly, producing accurate and up-to-date answers, lies at the foundation of secure cloud services.

Authenticated data structures provide cryptographically hardened integrity guarantees in distributed or cloud-based data management settings. They support authenticated queries on a data set that is outsourced to a third party and generally untrusted server, by allowing the server to return—along with the answer to a query—a proof that can validate the correct query execution.

C. Papamanthou et al., "Optimal Verification of Operations on Dynamic Sets," Proc. CRYPTO 2011, 91-110 (2011) and/or United States Patent Publication No. 2012/0030468, entitled "System and Method for Optimal Verification of Operations on Dynamic Sets," each incorporated by reference herein, describe tools and techniques for Authenticated Set Operations (ASO) for the case of "flat" set operations (i.e., only one set operation, e.g., intersection, of an arbitrary number of sets).

A need therefore exists for authenticated set operations for the class of queries and computations involving hierarchical set operations, over outsourced data, over which an arbitrary number and type of possibly nested set operations are performed to produce the final result. A further need exists for cryptographic protocols for securely verifying the correctness of the produced results.

SUMMARY OF THE INVENTION

The present invention in the illustrative embodiments described herein provides methods and apparatus for authenticated hierarchical set operations. According to one aspect of the invention, a third party server processes a query on a plurality of data sets $S_1, \ldots, S_n$ outsourced by a source of the data. The query comprises a hierarchical set operation between at least two of the data sets $S_1, \ldots, S_n$. At least one level of a hierarchy of the hierarchical set operation of the query comprises at least a first one of an intersection operation, a union operation and a set difference operation and at least a second level that is different than the first level of the hierarchy comprises at least a second distinct one of the intersection operation, the union operation and the set difference operation.

In one exemplary embodiment, the server method comprises obtaining from the source the data sets $S_1, \ldots, S_n$, corresponding encodings $a_1, \ldots, a_n$ of the data sets $S_1, \ldots, S_n$, and a verification of the encodings $a_1, \ldots, a_n$; generating an answer to the query using the data sets $S_1, \ldots, S_n$, parsing the query as a tree, wherein leaf nodes in the tree correspond to at least two of the data sets relevant to the query and non-leaf nodes in the tree correspond to at least one of the intersection operation, the union operation and the set difference operation; for each leaf node in the tree corresponding to a data set $S_i$, computing a verification for encoding $a_i$ that is based on the obtained encodings $a_1, \ldots, a_n$ and the obtained verification of the encodings $a_1, \ldots, a_n$; for each non-leaf node in the tree, computing at least one argument for a corresponding at least one of the intersection operation, the union operation and the set difference operation; and providing an encoding of the answer and a proof-of-correctness to the client, wherein the proof-of-correctness comprises the computed verification for each leaf node encoding, and the at least one argument for each non-leaf node set operation.

According to another aspect of the invention, a client verifies a query on a plurality of data sets $S_1, \ldots, S_n$ outsourced by a source of the data. In one exemplary embodiment, the client method comprises receiving from the server an encoding of an answer to the query and a proof-of-correctness, wherein the proof-of-correctness comprises a verification for at least two encodings of one or more of the data sets relevant to the query and at least one argument for at least one of the intersection operation, the union operation and the set difference operation; parsing the received proof-of-correctness as a tree, wherein leaf nodes in the tree correspond to at least two of the data sets relevant to the query and non-leaf nodes in the tree correspond to at least one of the intersection operation, the union operation and the set difference operation; for each leaf node in the tree corresponding to data set $S_i$, deriving and verifying a corresponding encoding $a_i$ using the corresponding received verification; for each non-leaf node in the tree, verifying the received at least one argument for a corresponding at least one of the intersection operation, the union operation and the set difference operation using the verified at least two encodings; for the root node in the tree, verifying the received encoding of an answer to the query using the verified at least two encodings; and accepting the answer if the verifying steps for all nodes in the tree are correct.

In one or more exemplary embodiments, the encodings $a_1, \ldots, a_n$ of the data sets $S_1, \ldots, S_n$ comprise accumulation values $a_1, \ldots, a_n$ and the encoding of the answer comprises one or more of the answer and coefficients $b_i$ of a characteristic polynomial of the answer. The at least one argument comprises one or more of an intersection argument comprising one or more of subset witnesses, completeness witnesses, and accumulation values and a union argument comprising one or more of subset witnesses, completeness witnesses, and accumulation values.

Various aspects of the invention may be employed by one or more of an authenticated keyword search, an authenticated SQL query answer, and a construction for verifying an evaluation of a function computable by polynomial size circuits.

According to an additional aspect of the invention, the source of the data performs the following steps prior to the third party server processing the query: generating a public key and a secret key; computing encodings $a_1, \ldots, a_n$ of the data sets $S_1, \ldots, S_n$; obtaining a verification of the encodings; providing the data sets $S_1, \ldots, S_n$, the corresponding computed encodings $a_1, \ldots, a_n$ and the obtained verification of the encodings to the third party server; and publishing the public key and a digest of the verification.

The disclosed exemplary techniques for authenticated hierarchical set operations overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 3A illustrates exemplary pseudo code for an exemplary implementation of a conventional query algorithm;

FIG. 3B illustrates exemplary pseudo code for an exemplary implementation of a conventional verify algorithm;

FIG. 12 is a flow chart describing an exemplary implementation of an answer verification process that may be implemented by the client of FIG. 1.

DETAILED DESCRIPTION

Aspects of the present invention provide verifiable hierarchical set operations (e.g., intersection and union) in an outsourced setting. Further aspects of the invention provide cryptographic protocols for securely verifying the correctness of the produced results.

In one exemplary embodiment, the disclosed exemplary verification techniques support: (1) efficient verification of the computation result in time that is asymptotically less than the time spent at the server to compute the result itself; and (2) operation-sensitive verification of the computation result in time that depends only on (the size of) the answer and (the parameters) of the query.

The verifiable hierarchical set operations described herein build upon the Authenticated Set Operation schemes by modifying and expanding them to include an extractable accumulator.

Two and Three Party Models

Aspects of the present invention may be employed in both a 3-party and a 2-party model of outsourced computation. Consider an owner of a data set, often referred to as the source, that wants to answer queries over the data set issued by one or more clients or users and, for reasons of scalability and efficiency, chooses to do so by employing a possibly untrusted server on the cloud.

Generally, according to aspects of the present invention, the source first performs some finger-printing signing operations on the data set, issues some publicly accessible digest information for its customers (clients) and then outsources the data set to the server. Following that, all query processing is handled by the server which produces query answers accompanied by cryptographic proofs that can be verified by the receiving user with respect to their consistency with digest of the data set.

The exemplary cryptographic proofs are constructed such that their successful verification with respect to the published digest corresponds (with overwhelming probability) to the query answer being correct, as if the query was answered locally by the trusted data owner and despite the fact that the server may act maliciously by trying to subvert the verification protocol so that incorrect answers and their proofs are forged to pass the answer verification check.

The above is a generalization of the 2-party model, where a single client owns a data set and outsources it at a cloud server for storage and query processing. In this case, the source owning the data set and the clients querying the data set are in fact the same entity. Observe that the client does not need to maintain a local copy of the data set for reasons of answer verification.

Figure 1:
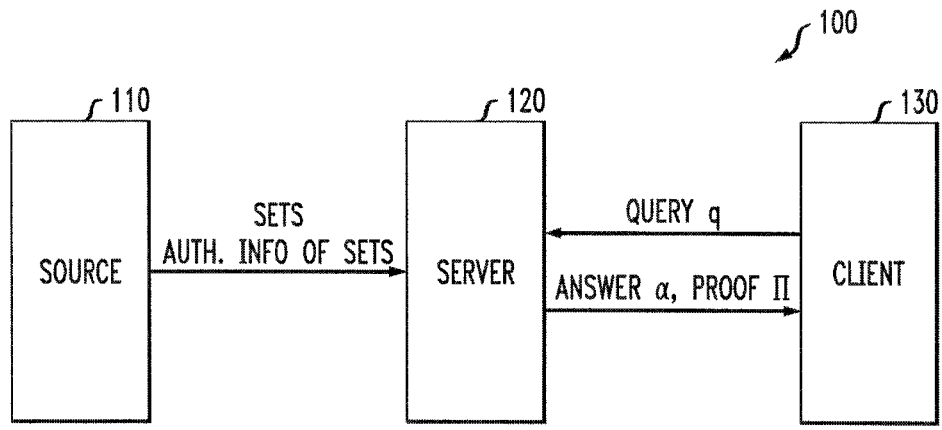
FIG. 1 illustrates an exemplary three party scenario, where a source owns data sets $S_1 \ldots, S_n$ and multiple clients ask queries of elaborate set operations over a given set $S_i$.

FIG. 1 illustrates an exemplary three party scenario, where a source 110 owns data sets $S_1 \ldots, S_n$ and multiple clients, such as client 130, ask queries of elaborate set operations (such as intersection and union) over one or more given sets $S_i$. In addition, as discussed below, the source 110 provides the data sets $S_1 \ldots, S_n$ and corresponding authentication information to an untrusted server 120. The server 120 processes the queries q from the clients 130 and provides an answer α with accompanying proof-of-validity Π.

Figure 2:
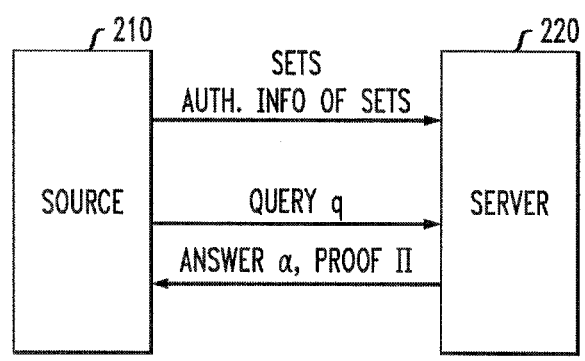
FIG. 2 illustrates an exemplary two party scenario where a source owns data sets $S_1 \ldots, S_n$ that are authenticated by the source and outsourced to the server with the corresponding authentication information.

FIG. 2 illustrates an exemplary two party scenario where a source 210 owns data sets $S_1 \ldots, S_n$ that are authenticated by the source 210 and outsourced to the server 220 with the corresponding authentication information. The source 210 later asks the server 220 to process queries, q, and the source 210 receives an answer α with accompanying proof-of-validity Π from the server 220.

Exemplary aspects of the invention provide efficient and operation-sensitive authentication schemes, i.e., schemes where the verification time and proof size are more efficient than the corresponding verification times and proof sizes that would be obtained if the entire query-answering process was verified step-by-step and, respectively, schemes where the verification time and proof size are independent of the size of the computation and only depend on the output size and the query parameters. One important aspect of the exemplary constructions is that they accommodate dynamic data sets that change over time under insertions, deletions and modifications in a way that maintains low upkeep efficiency on behalf of the server. Thus, the exemplary constructions can be used for instantiating general set operation queries over sets of data (such as shared documents and public files) as well as for the implementation of secure SQL-type queries over general outsourced relational databases.

Two exemplary constructions are discussed herein for efficiently supporting authenticated queries via hierarchical set operations in the above data outsourcing model. A first exemplary construction supports queries that include hierarchical intersections and union operations, but lacks the efficiency or operation-sensitivity property, namely, the proof size and the verification time are related to the total size of intermediate sets. For instance, for a query that demands the intersection of two unions, the proof size will be linear to the sum of the sizes of the two unions, whereas the final answer may be much smaller, or be even empty. The second exemplary construction is efficient and operation-sensitive and produces short proofs that can be verified in time only linear to the final proof size with an additional overhead equal to the number of sets involved in the query.

The above results are achieved in the authenticated data structure (ADS) paradigm which will be described in detail in a section entitled "Authenticated Data Structure Scheme." Aspects of the present invention extend C. Papamanthou et al., "Optimal Verification of Operations on Dynamic Sets," Proc. CRYPTO 2011, 91-110 (2011) and/or United States Patent Publication No. 2012/0030468, entitled "System and Method for Optimal Verification of Operations on Dynamic Sets," each incorporated by reference herein, where the basic tools and techniques described herein were introduced, for the case of "flat" set operations (i.e., only one set operation, e.g., intersection, of an arbitrary number of sets).

Aspects of the present invention are directed to a wider class of computations, namely hierarchical set operations consisting of an arbitrarily large combination of intersections and unions, but also set differences and negations. The problem of hierarchical set operations is inherently more difficult, since at some points along the path of the computation, authenticated results must be provided over non-authenticated sets (that have been produced as intermediate, partial, results up to that point in the computation). Applications of authenticated hierarchical set operations include authenticated SQL queries over relational databases, authenticated keyword searches over texts and authenticated computations via Boolean circuit evaluation.

As used herein, l denotes the security parameter and $v(l)$ denotes a negligible function. A function $f(l)$ is negligible if for each polynomial function $poly(l)$ and all large enough values of l, $f(l) < 1/(poly(l))$. An event can occur with negligible probability if its occurence probability is upper bounded by a negligible function. Respectively, an event takes place with overwhelming probability if its complement takes place with negligible probability.

Bilinear Pairings

Let G be a cyclic multiplicative group of prime order p, generated by g. Let also $G_T$ be a cyclic multiplicative group with the same order p and e: $G \times G \rightarrow G_T$ be a bilinear pairing with the following properties: (1) Bilinearity: $e(P^a, Q^b) = e(P,$ $Q)^{ab}$ for all $P, Q \in G$ and $a, b \in Z_p$. (2) Non-degeneracy: $e(g,g) \neq 1$. (3) Computability: There is an efficient algorithm to compute $e(P,Q)$ for all $P,Q \in G$. pub:=$(p,G,G_T,e,g)$ denotes the bilinear pairings parameters, output by the randomized polynomial-time algorithm GenKey on input $1^l$.

Bilinear Accumulators

An accumulation function acc maps multiple elements $x_i \in Z^*_p$ to a single element (accumulation value) in $Z^*_p$ for any $i \in N$. Namely given a set $X = (x_1, \ldots, x_\delta)$:

$$acc(X) = g^{\prod_{x_i \in X}(x_i + s)}$$

where $s \in Z^*_p$ is the secret value of the disclosed exemplary scheme. The above is a bilinear map accumulator introduced in L. Nguyen, "Accumulators from Bilinear Pairings and Applications," CT-RSA 2005, Lecture Notes in Computer Science Volume 3376, 275-292 (2005), incorporated by reference herein. Subject to the above accumulation function, a set $S \subset X$ has a subset witness $W_{S,X}$ calculated as $$W_{S,X} = g^{\prod_{x_i \in X \setminus S}(x_i + s)}.$$

Now a user that wishes to verify that a provided set S is a subset of set X can check the equality:

$$e(acc(S), W_{S,X}) \stackrel{?}{=} e(acc(X), g).$$

The Bilinear Accumulator represents each set $S_i$ by one group element $a_i$ referred to as an accumulation value.

In order to facilitate the calculation of accumulation values by an entity that has access only to public key information, the values $(g^s, \ldots, g^{s^y})$ also become publicly available.

Aspects of the present invention extend bilinear accumulators to provide an extractable accumulation scheme. See also, J. Groth, "Short Pairing-Based Non-Interactive Zero-Knowledge Arguments." ASIACRYPT 2010, Lecture Notes in Computer Science, Vol. 6477, (2010, Masayuki Abe ed.). The extractable accumulation scheme couples two appropriately defined bilinear accumulators in a way that a certain extractability property is satisfied as it will become clear later. The intuition behind this coupling comes from observing that the input $\sigma$ given to the adversary A can be seen as the public key for two related bilinear accumulators, with different (but related) accumulation bases. Then an adversary producing accumulation values for a set X under both of these accumulators must have knowledge of the set X.

Authenticated Data Structure Scheme

Let D be any data structure supporting queries and updates. auth(D) denotes the authenticated data structure and d denotes the digest of the authenticated data structure, i.e., a constant-size description of D. An authenticated data structure scheme A is a collection of the following six polynomial-time algorithms: {genkey; setup; update; refresh; query; verify}:

(1) $\{sk,pk\} \leftarrow genkey(1^k)$. Outputs secret and public keys sk and pk, given the security parameter k.

(2) $\{auth(D_0), d_0\} \leftarrow setup(D_0, sk, pk)$: Computes the authenticated data structure $auth(D_0)$ and the respective digest of it, $d_0$, given a plain data structure $D_0$, the secret key sk and the public key pk.

(3) $\{D_{h+1}, auth(D_{h+1}), d_{h+1}, upd\} \leftarrow update(u, D_h, auth(D_h),$ $d_h, sk, pk)$: On input an update u on data structure $D_h$, the authenticated data structure auth($D_h$) and the digest $d_h$, it outputs the updated data structure $D_{h+1}$ along with auth($D_{h+1}$), the updated digest $d_{h+1}$ and some relative information upd. It requires the secret key for execution.

(4) {Dh+1,auth($D_{h+1}$)$d_{h+1}$}←refresh(u,$D_h$,auth($D_h$),$d_h$,upd,pk): On input an update u on data structure $D_h$, the authenticated data structure auth($D_h$), the digest $d_h$ and relative information upd output by update( ), it outputs the updated data structure $D_{h+1}$ along with auth($D_{h+1}$) and the updated digest $d_{h+1}$, without having the secret key as input.

(5) {a(q),Π(q)}←query(q,$D_h$,auth($D_h$),pk): On input a query q on data structure $D_h$ and auth($D_h$) this algorithm returns the answer to the query a(q), along with a proof Π(q).

(6) {accept,reject}←verify(q,a(q),Π(q),$d_h$,pk): On input a query q, an answer a(q), a proof Π(q), a digest $d_h$ and pk, it outputs either accept or reject.

Let {accept,reject}=check(q,a(q),$D_h$) be a method that decides whether a(q) is a correct answer for query q on data structure $D_h$. check( ) is not part of the ADS scheme and is only introduced for ease of notation. There are two properties that an authenticated data structure scheme should satisfy, i.e., correctness and security:

Correctness of Authenticated Data Structure Scheme:

Let A be an authenticated data structure scheme {genkey; setup; update; refresh; query; verify}. The authenticated data structure scheme A is correct if, for all k∈N, for all (sk,pk) output by algorithm genkey( ), for all ($D_h$;auth($D_h$);$d_h$) output by one invocation of setup( ) followed by polynomially-many invocations of refresh( ), where h≥0, for all queries q and for all a(q);Π(q) output by query(q;$D_h$;auth($D_h$);pk), with all but negligible probability, whenever algorithm check(q;a(q),$D_h$) accepts, so does algorithm verify(q; a(q);Π(q);$d_h$;pk).

Security of Authenticated Data Structure Scheme:

Let A be an authenticated data structure scheme {genkey; setup; update; refresh; query; verify}, k be the security parameter, v(k) be a negligible function and (sk,pk)←genkey($1^k$). Let also A be a polynomially-bounded adversary that is only given pk. The adversary has unlimited access to all algorithms of A, except for algorithms setup( ) and update( ) to which he has only oracle access. The adversary picks an initial state of the data structure $D_0$ and computes $D_0$;auth($D_0$);$d_0$ through oracle access to algorithm setup( ). Then, for i=0; . . . ,h=poly(k), A issues an update $u_i$ for the data structure $D_i$ and outputs $D_{i+1}$,auth($D_{i+1}$) and $d_{i+1}$ through oracle access to algorithm update( ). Finally the adversary picks an index 0≤t≤h+1, a query q, an answer a(q) and a proof Π(q). We say that the authenticated data structure scheme A is secure if for all k∈N, for all (sk;pk) output by algorithm genkey( ), and for all polynomially-bounded adversaries A it holds that:

$$Pr\begin{bmatrix}(q, a(q), \Pi(q), t) \leftarrow A; & (\text{accept}) \leftarrow \text{verify}(q, a(q), \Pi(q), d_t, pk) \\ & (\text{reject}) \leftarrow \text{check}(q, a(q), D_t)]\end{bmatrix} =$$

$$neg(k).$$

Efficiency of ADS Schemes

Regarding the complexity of an ADS scheme, the verification time (and consequently the proof size) should be asymptotically less than the time needed for a user to compute a(q) by itself or asymptotically the same as the answer computation size. A scheme that satisfies the above property is said to be an efficient scheme.

ADS Scheme for Basic Set Operations

As indicated above, C. Papamanthou et al., "Optimal Verification of Operations on Dynamic Sets," Proc. CRYPTO 2011, 91-110 (2011) presents basic tools and techniques for "flat" set operations (i.e., only one set operation, e.g., intersection, of an arbitrary number of sets), referred to herein as ASO for "authenticated set operations." As described above, a 3-party model is considered where the involved parties are 1. a source 110 (or owner) O maintaining a data set $D_O$ comprising of sets $S_1, \ldots, S_T$;

2. numerous end users or clients 130 issuing set operation queries regarding $D_O$;

3. an intermediate server S (server 120) in charge of handling queries, computing answers and issuing answer-proof pairs for the users.

The scheme is based on the bilinear accumulator presented above. Another construction used is an accumulation tree which is used to verify the correctness of accumulation values for the sets involved in a particular query. For a more detailed discussion of the accumulation tree primitive, see, for example, C. Papamanthou et al., "Authenticated Hash Tables," CCS, 437-448 (2008) and/or United States Patent Publication No. 2011/0225429, entitled "Cryptographic Accumulators for Authenticated Hash Tables," each incorporated by reference herein.

An informal overview of the actions involved in the protocol follows:

1. Source 110 picks security parameter k and acquires {pk,sk}←genkey($1^k$). Consequently, by running algorithm setup, source 110 constructs an authenticated version of $D_O$, namely auth($D_O$) as well as a digest $d_O$.

2. Source 110 communicates {$D_O$,auth($D_O$),$d_O$,pk} to the server S (120), and publishes {$d_O$,pk} that serve as the public key information for the scheme. It should be noted here that this scheme has the property of being publicly verifiable.

3. A user 130 that wants a query q answered, sends q to the server S (120). The server 120 computes an answer a(q) and proof Π(q) using algorithm query which will be explained in more detail below.

4. Upon receiving {a(q),P(q)}, the user 130 verifies correctness by running verify, as discussed further below in conjunction with FIG. 12.

ASO also includes algorithms update, refresh that are used to accommodate updates on the original data set without the source having to recompute the new authenticated version of the data set from scratch. Namely, source 110 runs update and produces new tuple {$D_{i+1}$,auth($D_{i+1}$), $d_{i+1}$)} in constant time (independent of the size of $D_i$) as well as update digest upd. Consequently the server 120 receives upd and by running refresh produces {$D_{i+1}$,auth($D_{i+1}$,$d_{i+1}$)} also in constant time. It is noted that the ability to accommodate dynamic data sets is what puts the above scheme apart from constructions that only address the problem of static, pre-defined sets.

The exemplary algorithms query and verify come with two modes of operation, e.g., one for the case of union and one for intersection. The operation can be described in both cases in three steps. Firstly, the accumulation values of all t sets involved in the query q are returned, accompanied by corresponding proofs $\Pi_1, \ldots, \Pi_t$ that can be verified by the use of public information $d_h$ with use of algorithms queryTree, verifyTree related with the accumulation tree primitive. This step can be distinguished by the rest of the query answering procedure. Secondly, polynomial coefficients of the accumulation value of the answer set a(q) are computed. These coefficients could be calculated by the user 130 (since he has access to the set and pk) but the fact that they are given by the server 120 helps lower the verification time complexity. Finally, depending on the type of query (union or intersection) a set of bilinear equalities are checked based on witness values computed by the server 120.

FIG. 3A illustrates exemplary pseudo code 300 for an exemplary implementation of the query algorithm and FIG. 3B illustrates exemplary pseudo code 350 for an exemplary implementation of the verify algorithm.

Scheme 1: ADS Scheme for Hierarchical Set Operations

A first exemplary approach to hierarchical set operations extends ASO in order to accommodate hierarchical set operations.

Figure 4:
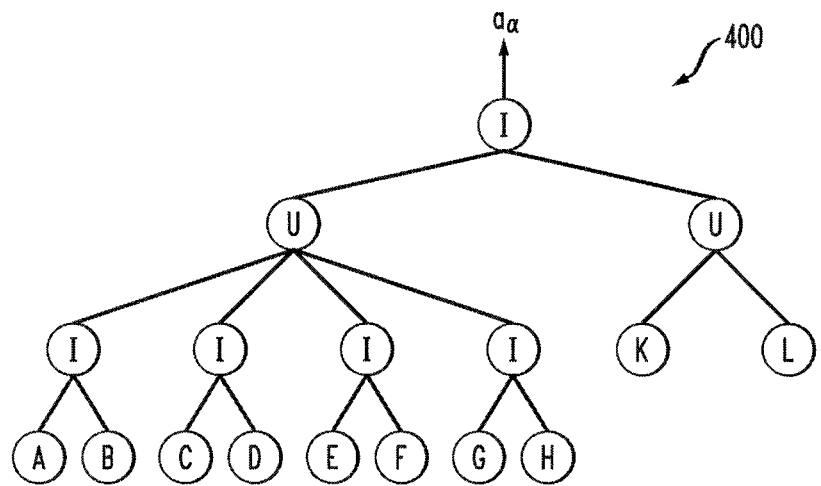
FIG. 4 illustrates an exemplary tree T for representing a hierarchical set operation.

FIG. 4 illustrates an exemplary tree T (400) for representing a hierarchical set operation. The exemplary hierarchical set operation comprises:

q→((A ∩ B) U (C ∩ D) U (E ∩ F) U (G ∩ H) ∩(K U L)).

As shown in FIG. 4, a set operation query can be parsed as a tree T (400) with original sets (A, B, C, D, E, F, G, H, K, L) at the leaf nodes, set operations (e.g., U and I) at internal nodes and output $a_q$ set at the root node.

Consider an example having a two-level operation such as (A⊕B)⊕C where ⊕ can either be union or intersection (but not the same in both positions since that would trivially reduce to the "flat" case). Assume A,B,C are sets that have originally been authenticated by the source. Then one strategy in order to get an authenticated result for the final answer, would be to first verify the correctness of the intermediate result I:=A⊕B, using ASO, and consequently verify the correctness of the final result F:=I⊕C again by using the original verification algorithm after returning I to the user. In this manner, the security of the exemplary hierarchical scheme is directly reduced to the security of the underlying ADS.

Figure 5:
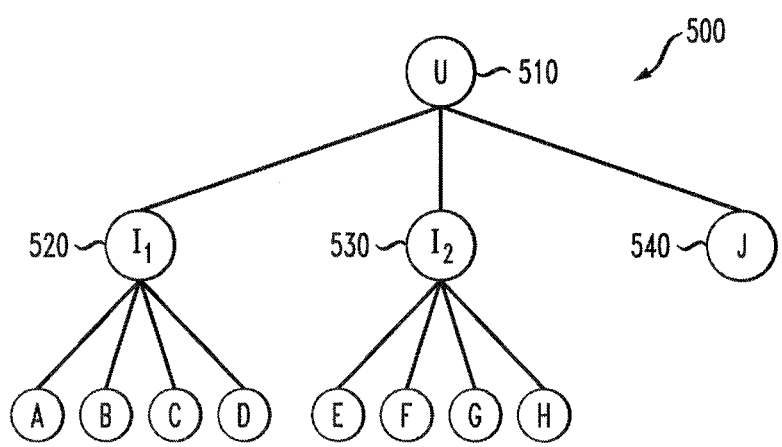
FIG. 5 illustrates an exemplary tree representing the union of the result of two intersection operations $I_1$ and $I_2$ and a set J.

FIG. 5 illustrates an exemplary tree 500 representing the union (node 510) of the result of two intersection operations $I_1$ and $I_2$ (nodes 520, 530) and a set J (node 540). The intersection operations $I_1$ and $I_2$ (nodes 520, 530) are applied to a plurality of sets A-D and E-H, respectively.

The techniques of C. Papamanthou et al., "Optimal Verification of Operations on Dynamic Sets," Proc. CRYPTO 2011, 91-110 (2011) and/or United States Patent Publication No. 2012/0030468, entitled "System and Method for Optimal Verification of Operations on Dynamic Sets," can be applied iteratively for each hierarchical operation in a "black box" manner to process the output of a previous operation. In addition, for such hierarchical queries, this technique is repeated iteratively (for each operation) providing all intermediate results.

For example, the intersection operations $I_1$ and $I_2$ can be processed separately as "flat" operations to obtain the corresponding Intersection proof for each intersection operation and intermediate results for $I_1$ and $I_2$. The Intersection proof for each intersection operation comprises values $W_S$, $F_S$ for each set S involved in the respective intersection operation. Thereafter, the union operation U can be processed as a "flat" operation to obtain the corresponding Union proof for the union operation and the final result (answer element) for U. The Union proof for the union operation comprises values $W_S$ for each set S involved in the union operation (here, $W_{I1}$, $W_{I2}$ and $W_J$), as well as a value $w_i$ for each answer element $w_i$.

The accumulation values of sets A, . . . ,H and J in FIG. 5 are verified by an accumulation tree and the accumulation values of sets $I_1$ and $I_2$ are verified because the corresponding sets (intermediate results) are explicitly given.

It can be observed that, in the original ASO scheme, a proof Π(q) that is paired with an answer a(q) for query q can be partitioned in two parts $\Pi_1$, $\Pi_2$ such that $\Pi_2 = \pi_1, \ldots, \pi_t$ is related with verifying the correctness of the accumulation values of the t sets involved in the computation (see step (2) of query algorithm 300 of FIG. 3A) and $\Pi_1 = \{(b_1, \ldots, b_t), W\}$ where $b_i$ are the polynomial coefficients of the accumulation value of a(q) and W is the set of witnesses depending on the type of query. Respectively, the verification procedure can be separated into two subroutines, one for the verification of the correctness of the returned accumulation values of the involved sets (using only $\Pi_2(q)$) and one for the verification of the correctness of a(q).

Based on the above observation, the following modified algorithms are defined:

Algorithm $\{a(q), \Pi_1(q)\} \leftarrow$ query*$(q, D_h, \text{auth}(D_h), pk)$:

Run algorithm query (FIG. 3A), discard $\Pi_2(q)$ and return only $\{a(q), \Pi_1\}$ Algorithm $\{\text{accept}, \text{reject}\} \leftarrow$ verify*$(q, a(q), \Pi_1(q), (\text{acc}(I_1), \ldots, \text{acc}(I_t)), d_h, pk)$:

Run algorithm verify (FIG. 3B) skipping step (1) and use the provided $\text{acc}(S_i)$ as the accumulated values for step (3). $S_1, \ldots, S_t$ are the t sets involved in the computation. Observe that it is assumed that the verifying client 130 already has access to the accumulation values of the original (not intermediate) sets that are involved in the computation. Using the above modified algorithms, a query answering and verification procedure is constructed for an ADS scheme for hierarchical set operations incorporating aspects of the present invention.

In a n-level operation for a query q involving k intermediate results, the server 120 must return a(q),P(q), where P(q) will contain proofs of correctness for all intermediate results. These intermediate proofs of correctness are defined herein as $P_i(q)$ for i=1, . . . ,k. Observe that at each level i of computation there may be more than one intermediate set results which we denote by $I_{i_1}, \ldots,$ $$I_{i_1}, \ldots, I_{i_{k_i}}.$$

Now the query answering and verification algorithms of the exemplary hierarchical scheme are:

Algorithm $\{a(q), P(q)\} \leftarrow$ hquery$(q, D_h, \text{auth}(D_h), pk)$:

Where P(q) contains:

(a) For each of the intermediate results at the first level of computation, run query and add its output (including the intermediate set itself) to P(q)

(b) For j=2, . . . ,n run query* for each of the intermediate results in the j-th level and add its output to P(q).

Algorithm $\{\text{accept}, \text{reject}\} \leftarrow$ hverify$(q, a(q), P(q), d_h, pk)$:

(a) For each of the results on the first level of the computation, run verify in order to verify the correctness of all partial results $I_{1,1}, \ldots I_{1,k_1}$. Output reject if any run of verify outputs reject. Store all computed accumulation values of $I_{1,i}$ in table ACC (b) For j=2, . . . ,n run for every one of the partial results on the j-th level, the algorithm verify* looking up accumulation values from ACC. After each run for set $I_{j,i}$ add its accumulation value to ACC. If at any point verify* outputs reject, output reject otherwise output accept.

All other algorithms, namely, genkey, setup, update, and refresh remain the same as in ASO.

The intuition behind this construction is that after verification of intermediate results for each level, these sets are elevated to the same level of trust, on behalf of the client 130, as the sets originally signed by the trusted source 110 of the scheme. This allows a reduction of breaking the security of a multi-level computation to breaking the security of a single-level computation. One final observation is that, at intermediate levels, it might be that the input is not only the partial results from the previous level but also one or more of the original sets.

The above verification algorithm verifies the correctness of all the intermediate results using the original verification algorithm which runs in time linear to the size of each set and also to the number of sets participating in the computation. Since each partial result on level j contributes to only one partial result on level j+1, it follows that the total running time of the verification algorithm (as well as the total proof size) is $$O\left(\sum_{i=1}^{k} t_i + \sum_{i=1}^{l} \delta_i\right),$$

where $\delta_i$ is the cardinality of the i-th intermediate result and $t_i$ is the number of sets involved in the computation. Since a tree having t leafs can contain at most t−1 internal nodes (this happens for a full binary tree) the above can be written as $$O\left(t + \sum_{i=1}^{l} \delta_i\right).$$

Efficient Authenticated Hierarchical Set Operations

The above construction yields a secure scheme. Assume for example that a 2-level query must be answered consisting of unions of sets in the first level and an intersection of these unions in level two, i.e. $(A_1 \cup A_2) \cap (A_3 \cup A_4) \ldots \cap (A_{n-1} \cup A_n)$. The final result may be small compared with the original $A_i$'s (indeed, since it is an intersection, it may even be that the final result is empty), therefore, following the spirit of the original AΣO scheme, a verification algorithm is needed that runs independently of the size of the intermediate sets. The previous construction, however, does not have this property, as it runs in time linear to the total size of all the intermediate results (which in this case, since the intermediate computations are unions, can be as large as the sum of the sizes of all the original sets). However, in a case where the final answer output is the largest set involved in the computation, (for example when query corresponds to a set union), efficiency is achieved. In order to construct an efficient ADS scheme for hierarchical set operations, some tools are first defined.

Extractable Accumulation Scheme

One way to improve the above scheme is by removing all intermediate sets of the proof. The problem with such an approach is that, under certain assumptions, an adversary must be provided with the set for which the false answer is being provided. Hence, an adversary that cheats for one of the intermediate results will not be caught since he does not reveal the supposed set for which he cheated. Observe that it might be that all subsequent sets in the query (including the final answer) may be computed truthfully with respect to this cheating intermediate result.

Another observation is that any adversary that cheats using accumulation values of sets he has knowledge of can be used to break ASO. Hence, a way to "force" a server 120 to prove to the client 130 that he knows all the intermediate sets used to compute the accumulation values in the proof is needed. One way to achieve this, is to include these sets in the proof and indeed that is on a high level what the security of our first scheme is based on. However, this is achieved at the cost of efficiency as discussed above.

An extractable accumulation scheme is defined herein as an extension of the one-way accumulator by adding the following two algorithms:

Algorithm ka←KnowledgeAccumulate(pk,$\{x_i, \ldots, x_n\}$)
Algorithm {accept,reject}←VerifyKnowledge(pk,ka)

ka is a knowledge accumulation for set X and, in a sense, serves as a short argument of knowledge for set X. The security definition for this extended accumulation scheme is the same as for the bilinear accumulator of the ASO. The additional following property is provided:

Extractability—An accumulation scheme is extractable if for any non-uniform probabilistic polynomial time adversary A that, upon input the public key of the extractable accumulation scheme, outputs value ka such that VerifyKnowledge(pk,ka)=accept, there exists non-uniform probabilistic polynomial time extractor E that upon the same input as A outputs set $X=\{x_1, \ldots, x_n\}$ such that KnowledgeAccumulate(pk,X)=ka with overwhelming probability.

Generally, extractability forces the server 120 to produce accumulation values only for allowed sets without providing these sets. This is achieved with an additional element $\breve{a}_i$. In this manner, hierarchical queries can be processed without processing (possibly huge) intermediate results.

In order to construct an extractable accumulation scheme, two bilinear accumulators (i.e., a primary bilinear accumulator and a secondary bilinear accumulator), must be set up that are related in a particular way. The public key of the secondary accumulator is created by raising each element in the public key of the primary bilinear accumulator to an element x that remains hidden from adversaries and becomes part of the secret key of the scheme. $a_i$ denotes the accumulation value of set $S_i$ created by the primary accumulator and $\breve{a}_i$ denotes the accumulation value of the same set $S_i$ created by the secondary accumulator. On a high level, the (provable) claim is that any adversary that produces (given both public keys) any two elements such that one of them raised to x equals the other one, knows a particular corresponding set such that the first element is the accumulation value of this set with respect to the primary accumulator and the second set is the accumulation of the same set with respect to the secondary accumulator.

The following is an extension to the bilinear accumulator for the construction of an extractable accumulation scheme, consisting of the following algorithms:

1. Algorithm {pk,sk}←GenKey($1^k$) Choose (p,G,$G_T$,e,g) exactly as before. Choose uniformly at random from $Z^*_p$ elements s,a. Compute tuple $\{g,g^s, \ldots, g^{s^q}, g^a, g^{as}, \ldots, g^{as^q}\}$ where the first part is the same as the secret key of the original bilinear accumulator. Let us for ease of notation denote h:=$g^a$. Output pk=(p,G,$G_T$,e,g,$g^s, \ldots, g^{s^q}$,h,$h^s, \ldots, h^{s^q}$) and sk=(s,a).

Here, the bilinear accumulator is enhanced with a second accumulation function for a different exponentiation base h, the discrete log of which with respect to the exponentiation base of the original accumulation base g is part of the secret key. The accumulators defined by these two accumulation functions are referred to as primary accumulator and secondary accumulator, respectively. All algorithms of the exemplary extractable accumulation scheme make use only of the primary accumulator and in the following discussion, whenever the accumulation value acc(·) of a set is referenced, it refers to the accumulation value computed using the primary accumulator. That is, set accumulation, witness computation and verification essentially ignore the second part of the public key.

2. Algorithm $\{d,\tilde{d}\} \leftarrow$ KnowledgeAccumulate(pk, $x_1, \ldots, x_n$) Given a set $X = \{x_1, \ldots, x_n\}$ with $n \leq q$ compute $d :=$ $$g^{\prod_{x_i \in X} (x_i + s)} \text{ and } \tilde{d} := h^{\prod_{x_i \in X} (x_i + s)}.$$

Output values $\{d, \tilde{d}\}$.

3. Algorithm $\{\text{accept,reject}\} \leftarrow$ VerifyKnowledge(pk,d,$\tilde{d}$)

Check the equality $e(d,g^a) \stackrel{?}{=} e(\tilde{d},g)$

Observe that these values can be computed using only the public key since the polynomial $$X(s) = \prod_{i=1}^{n} (x_i + s) \text{ can be written as } \sum_{i=1}^{n} b_i s^i.$$

The values $$g^{b_i s^i}$$

can be directly computed using the pk and then multiplied to form $d,\tilde{d}$. Also, $$e\left(g^{\prod_{x_i \in X}(x_i+s)}, g^a\right) = e\left(g^{a\prod_{x_i \in X}(x_i+s)}, g\right) = e\left(g^{\sum_{i=1}^{n} ab_i s^i}, g\right) = e(h, g).$$

Intersection Argument

A further aspect of the invention provides a method for verifying that an intersection operation is performed correctly. This construction is a natural extension of ASO but mainly using an extractable accumulation scheme. $I = S_1 \cap \ldots \cap S_t$ is the wanted operation. Access is assumed to the public key of an extractable accumulation scheme for all parties. Let also $a_1, \ldots, a_t$ be the accumulation values corresponding to sets $S_i$. The intersection set I is uniquely characterized by the following two properties: (a) $I \subseteq S_i$ for all $S_i$ and (b) $\cap_{i=1}^{t}(S_i \backslash I) = \emptyset$. The first captures that all elements of I belong in all of $S_i$ and the second that no elements are left out. The above properties can be efficiently verified, given elements $W_i, F_i$ for i=1, . . . ,t and a (candidate) accumulation value $a_I$ for I, by the following bilinear equalities:

$$e(a_I, W_i) = e(a_i, g) \; \forall i=1, \ldots, t \quad (1)$$

$$\prod_{i=1}^{t} e(W_i, F_i) = 1. \quad (2)$$

The above two checks are sufficient to prove that $a_I$=acc(I) if the verifier also has access to the set I. It is desirable to prove a claim for $a_I$ without providing set I. If the verifier is provided with element $\tilde{a}_I$, by checking $$e(\tilde{a}_I, g^a) = e(a_I, g), \quad (3)$$

the verifier can gain confidence that $a_I$ indeed refers to the correctly computed intersection (or a soft cheating).

The algorithms proveIntersection and verifyIntersection are the two methods described above to construct the necessary elements for the intersection argument and to verify the relations (1)-(3).

Figure 6:
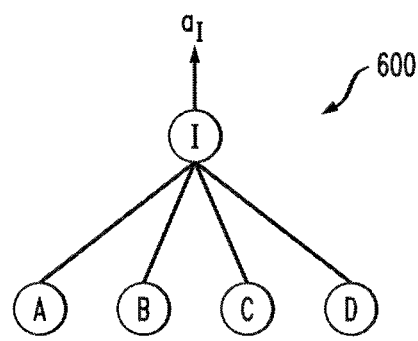
FIG. 6 illustrates the application of the extractable accumulation scheme to an exemplary tree comprised of a query involving a hierarchical intersection set operation.

FIG. 6 illustrates the application of the extractable accumulation scheme to the exemplary tree 600 comprised of a query involving the following exemplary hierarchical intersection set operation, in accordance with aspects of the present invention:

q→A ∩ B ∩ C ∩ D.

The proof of the query answer generated by the exemplary extractable accumulation scheme comprises the following accumulation values and witness values:

$\Pi_I = \{(a_I, \tilde{a}_I), W_A, W_B, W_C, W_D, F_A, F_B, F_C, F_D\}$, where $a_I$ denotes the accumulation value created by the primary accumulator, $\tilde{a}_I$ denotes the accumulation value created by the secondary accumulator, $W_n$ denotes subset witnesses and $F_n$ denotes completeness witnesses, as more fully described in C. Papamanthou et al., "Optimal Verification of Operations on Dynamic Sets," Proc. CRYPTO 2011, 91-110 (2011) and/or United States Patent Publication No. 2012/0030468, entitled "System and Method for Optimal Verification of Operations on Dynamic Sets."

Union Argument

Another aspect of the invention provides a method for proving the correctness of a union method. Again, set $U = S_1 \cup, \ldots, \cup S_t$, and let $a_i$ be the corresponding accumulation values as above. The union set U is uniquely characterized by the following two properties: (a) $S_i \subseteq U$ for all $S_i$ and (b) For each element $x_j \in U$, $x_j \in S_i$ for some i between 1 and t. The above properties can be efficiently verified, given elements $W_i, w_j$ for i=1, . . . t and j=1, . . . ,|U| and a (candidate) accumulation value $a_U$ by checking the following equalities:

$$e(a_i, W_i) = e(a_U, g) \; \forall i=1, \ldots, t$$

$$e(g^{x_j} g^s, w_j) = e(a_U, g) \; \forall j=1, \ldots, |U|.$$

Observe that in order to check the above, the verifier must have access to U; indeed, under that condition these checks are sufficient to provide security. However, as before, it is desired to prove a claim for $a_U$ without access to U. Moreover, the number of equalities to be checked for the union case is linear to the number of elements in the output set. Such an approach (even if having to provide U explicitly is avoided) would lead us to a scheme lacking efficiency. One can easily observe the similarity such a scheme would have with the first exemplary construction in terms of proof size and verification time. Therefore, it is desirable to not only avoid the necessity to provide U, but also to restrict the number of necessary checks.

The exemplary approach stems from the inclusion-exclusion principle of set theory. Namely, for set U=A∪B it holds that U=(A+B)\(A∩B) where A+B is a simple concatenation of elements from sets A,B (allowing for multisets) or, in a more useful manner, A+B=U∪(A∩B). Given the accumulation values $a_A, a_B$ the above can be checked by the bilinear equality $e(a_A, a_B) = e(a_U, a_{A \cap B})$. Thus, with access to U, I=A∩B and a proof-of-correctness for I, one can verify the correctness of $a_U$ checking a number of equalities independent of the size of U by checking equalities (2),(3) and the above. This reduces the number of necessary equality checks but there are still two issues to be dealt with. Firstly, the verifier still needs access to U (in addition access to I is also necessary, but it must be that |I|≤|U|) and, secondly, the above approach does not scale well with the number of input sets for the union operation.

In order to deal with the first of the above issues, the proof values also include $a_I, \tilde{a}_U, \tilde{a}_I$ where the verifier can check $e(a_U, g^a) = e(\tilde{a}_U, g)$ and $e(a_I, g^a) = e(\tilde{a}_I, g)$. Hence the verifier gets a proof of validity for the accumulation of set I and correspondingly can verify the correctness of the accumulation value of U (once again, except for the case of soft cheating). The semantics of a set union operation over t sets is now described. For the rest of the section, without loss of generality, assume $\exists k \in N$ such that $2^k = t$, i.e., t is a power of 2. Let us define $U_1, \ldots, U_{t/2}$ as the sets $(S_1 \cup S_2), \ldots, (S_{t-1} \cup S_t)$. For set U, it holds that $U = U_1, \ldots, U_{t/2}$ due to commutativity of the union operation.

One can use the intuition explained above in order to prove the correctness of (candidate) accumulation values $a_{U_i}$ corresponding to sets $U_i$ and, following that, apply repeatedly until set U is reached. Semantically this corresponds to a binary tree T of height k with the original sets $S_i$ at the t leafs (level 0), sets $U_i$ as defined above at level 1, and so on, with set U at the root at level k. Each internal node of the tree corresponds to the set resulting from the union operation over the sets of its children nodes. In general, $U_1^{(j)}, \ldots, U_{t/2^j}^{(j)}$ denotes the sets appearing at level j. Each internal node of T has exactly two kids and $I_i^{(j)}$ denotes the intersection of the sets corresponding to its children nodes. The following proves the validity of the accumulation value of a union set operation that can be constructed with access to the public key of an extractable accumulation scheme and accumulation values $a_i$ corresponding to original sets $S_i$.

Each internal node of the binary tree T corresponding to the union operation is as described above. For ease of notation A,B denotes the two sets corresponding to its children nodes, U,I their union and intersection respectively. The proof contains:

1. For each $U_i^{(j)}$ of level j=1, . . . ,k, knowledge accumulation values $d_U, \tilde{d}_U, d_I, \tilde{d}_I$ corresponding to sets U,I as defined above.

2. For each $U_i^{(j)}$ of level j=1, . . . ,k, values $W_A, W_B, F_A, F_B$ as defined in the intersection argument.

Observe that $a_U$ is by definition equivalent to the first element in the knowledge accumulation of set $U := U_1^{(k)}$. In order to verify the correctness of $a_U$ the verifier checks the following:

1. Parse all knowledge accumulations as $$a_{U_i^{(j)}}, \tilde{a}_{U_i^{(j)}}$$

and $$a_{I_i^{(j)}}, \tilde{a}_{I_i^{(j)}};$$

2. Check that the following equalities hold for each internal node $U_i^{(1)}$ at level 1 in T:

$$e\left(a_{I_i^{(1)}}, W_A\right) = e(a_A, g) \quad (4)$$

$$e\left(a_{I_i^{(1)}}, W_B\right) = e(a_B, g) \quad (5)$$

$$e(W_A, F_A)e(W_B, F_B) = 1 \quad (6)$$

$$e\left(a_{I_i^{(1)}}, a_{U_i^{(1)}}\right) = e(a_A, a_B) \quad (7)$$

$$e\left(\tilde{a}_{I_i^{(1)}}, g\right) = e\left(a_{I_i^{(1)}}, g\right) \quad (8)$$

$$e\left(\tilde{a}_{U_i^{(1)}}, g\right) = e\left(a_{U_i^{(1)}}, g\right). \quad (9)$$

3. Check that the following equalities hold for each internal node $U_i^{(j)}$ in T for j≥2:

$$e\left(a_{I_i^{(j)}}, W_A\right) = e\left(a_{U_{2i-1}^{(j-1)}}, g\right) \quad (10)$$

$$e\left(a_{I_i^{(j)}}, W_B\right) = e\left(a_{U_{2i}^{(j-1)}}, g\right) \quad (11)$$

$$e(W_A, F_A)e(W_B, F_B) = 1 \quad (12)$$

$$e\left(a_{I_i^{(j)}}, a_{U_i^{(j)}}\right) = e\left(a_{U_{2i-1}^{(j-1)}}, a_{U_{2i}^{(j-1)}}\right) \quad (13)$$

$$e\left(\tilde{a}_{I_i^{(j)}}, g\right) = e\left(a_{I_i^{(j)}}, g\right) \quad (14)$$

$$e\left(\tilde{a}_{U_i^{(j)}}, g\right) = e\left(a_{U_i^{(j)}}, g\right). \quad (15)$$

Intuitively any verifier can, by checking the above equalities, gain confidence that $a_U$ indeed refers to the correctly computed intersection (or a soft cheating).

Both proof size and verification time of the above construction are independent of intermediate set sizes and only linear to the number of involved original sets. This follows easily from the semantic representation of the union operation as a binary tree with the t original input sets to the union. It follows that the total number of internal nodes in this tree is O(t) (technically t−1) and checking each equality above can be done in constant time (all pairing inputs are precomputed) thus both proof size and verification time are O(t).

The algorithms proveUnion and verifyUnion are the two methods described above to construct the necessary elements for the intersection argument and to verify the relations (4)-(15).

Figure 7:
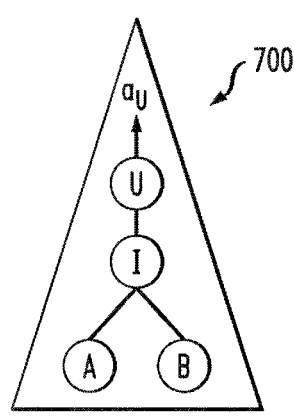
FIG. 7 illustrates the application of the extractable accumulation scheme to the exemplary tree comprised of a query involving a hierarchical union set operation having two sets.

FIG. 7 illustrates the application of the extractable accumulation scheme to the exemplary tree 700 comprised of a query involving the following exemplary hierarchical union set operation having two sets, in accordance with aspects of the present invention:

q→A U B

The proof of the query answer generated by the exemplary extractable accumulation scheme comprises the following accumulation values and witness values:

$\Pi_U = \{(a_I, \breve{a}_I), (a_U, \breve{a}_U), W_A, W_B W_C, W_D, F_A, F_B, F_C, F_D\}$ where $a_I$ and $a_U$ denote the accumulation values created by the primary accumulator, $\breve{a}_I$ and $\breve{a}_U$ denote the accumulation value created by the secondary accumulator, $W_n$ denotes subset witnesses and $F_n$ denotes completeness witnesses, as more fully described in C. Papamanthou et al., "Optimal Verification of Operations on Dynamic Sets," Proc. CRYPTO 2011, 91-110 (2011) and/or United States Patent Publication No. 2012/0030468, entitled "System and Method for Optimal Verification of Operations on Dynamic Sets."

Figure 8:
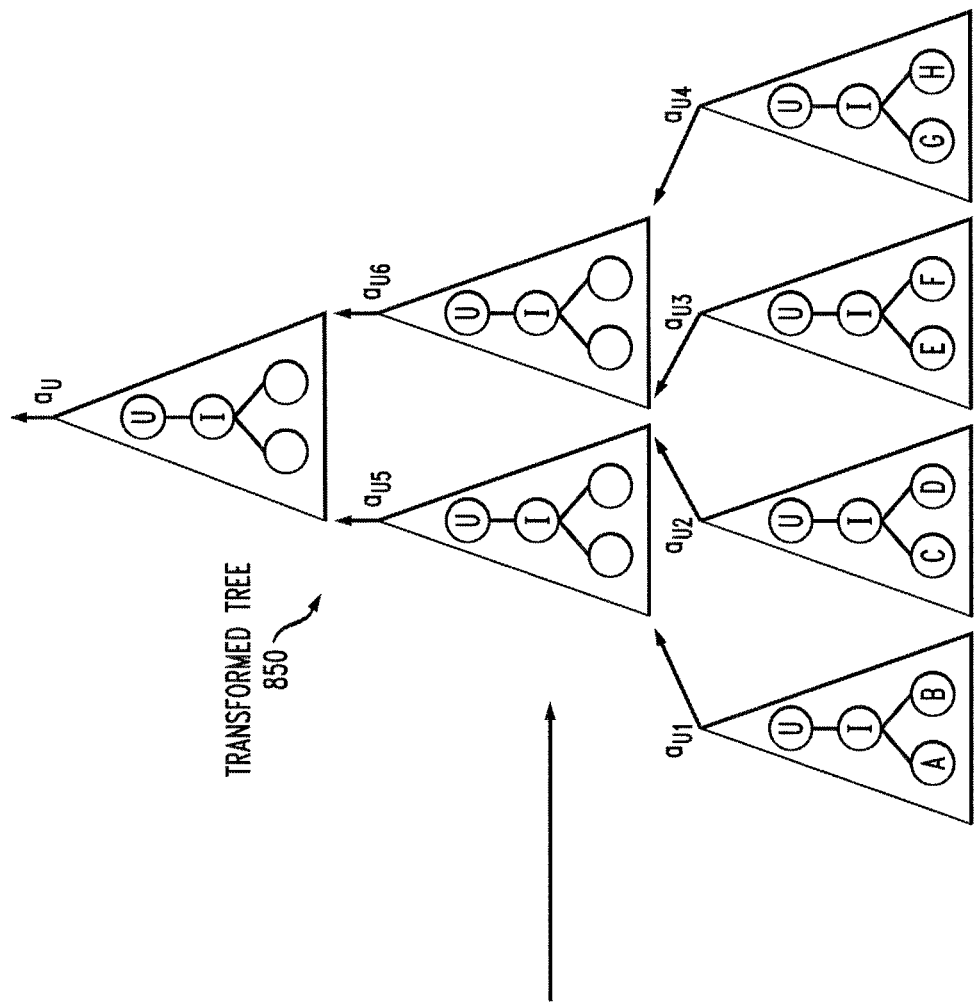
FIG. 8 illustrates the application of the extractable accumulation scheme to the exemplary tree comprised of a query involving a hierarchical union set operation having multiple sets.

FIG. 8 illustrates the application of the extractable accumulation scheme to the exemplary original tree 800 comprised of a query involving the following exemplary hierarchical union set operations having multiple sets, in accordance with aspects of the present invention:

q→A U B U C U D U E U F U G U H

The exemplary original tree 800 is transformed into a transformed tree 850, as shown in FIG. 8 using a combination of two-set unions. The proof of the query answer generated by the exemplary extractable accumulation scheme comprises the following:

Π=concatenation of union argument proofs for two elements (FIG. 7).

Figure 9:
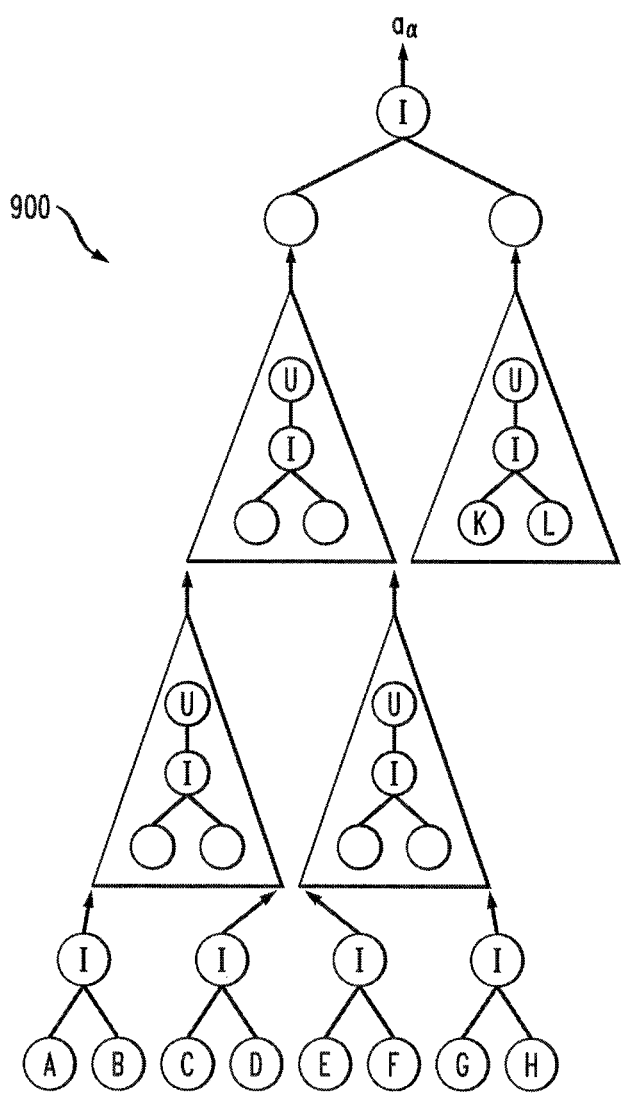
FIG. 9 illustrates the application of the extractable accumulation scheme to the exemplary original tree comprised of a query involving hierarchical set operations having multiple sets.

FIG. 9 illustrates the application of the extractable accumulation scheme to the exemplary original tree 900 comprised of a query involving the following exemplary hierarchical set operations having multiple sets, in accordance with aspects of the present invention:

q→(( A ∩ B) U (C ∩ D) U (E ∩ F) U (G ∩ H) ∩ (K U L)

The proof of the query answer generated by the exemplary extractable accumulation scheme comprises the following:

Π=concatenation of union/intersection argument proofs (FIGS. 6-8).

Scheme 2: An Efficient ADS Scheme for Hierarchical Set Operations

Using the above constructions, it has been shown how one can verify the correctness of candidate accumulation values for set unions and operations. On a high level, by composing all of the above methods one can prove (and verify) the correctness of a computation corresponding to general hierarchical set operations. Observe that so far, it has been assumed that the verifier has access to (or can efficiently verify the validity of) the accumulation values of all original sets, i.e., "trusts" that $a_i = S_i$ for all original sets. In the context of an ADS scheme, the trusted source 110 must provide an efficient way for the client 130 to verify that. To this end, an accumulation tree is employed. This cryptographic primitive can be seen as an analog of Merkle trees for proving set membership with respect to a digest value h with the additional benefit that it provides constant size proofs that are also verifiable in constant time for the set membership problem, while at the same time, maintaining efficient updates.

Assume a data structure $D_0$ comprised of sets $S_1, \ldots S_T$ with elements from $Z^*_p$.

1. Algorithm $\{pk,sk\} \leftarrow genkey(1^l)$ Run key-generating algorithms for the extractable accumulation scheme defined above and an accumulation tree with corresponding security parameters to receive keys $pk_1, pk_2, sk_1, sk_2$. Output $pk=pk_1, pk_2$ and $sk=sk_1, sk_2$.

2. Algorithm $\{auth_{D_0}, h_0\} \leftarrow setup(D_0, pk, sk)$ Compute accumulation values $a_i$ for $S_i$ where $i=1, \ldots, T$. Moreover, compute accumulation tree AT over values $\{i, a_i\}$. The authenticated data structure consists of $\{a_1, \ldots, a_T, AT\}$ and $h_0$ is the digest of the accumulation tree.

3. Algorithms update and refresh are similar to ASO.

Now, given a query Q that corresponds to a number of hierarchical set operations over sets $S_1, \ldots S_t$ (without loss of generality, let these be the t first of the T sets) and T be the tree that maps q with $S_i, \ldots, S_t$ at its leafs. For ease of illustration, the mode of operation of the exemplary algorithms are described for the case where all sets $S_i$ are at the same level of the computation, i.e., all leafs of T are at the same level. The necessary modifications in order to explicitly cover the case where original sets are higher in the query, follow in a straight-forward manner from the following analysis, since any set $S_i$ encountered at an advanced stage of the process is treated in the exact same manner as for the sets residing at the tree leafs. The following algorithms are defined:

4. Algorithm $\{\alpha, \Pi\} \rightarrow hquery(q, D, auth_D, h, pk)$ Let D be the most up to date version and $auth_D, h$ be the corresponding authenticated values. Compute the result of the set operations described in q over sets $S_i$, as $\alpha = x_1, \ldots, x_\delta$ and denote $|\alpha| = \delta$. Construct proof Π as follows:

(a) Compute proof-of-membership $\pi_i$ for each pair $(i, a_i)$ using AT.

(b) For each internal node $v \in T$ compute proof P(v):

If v corresponds to a set intersection, let P(v) be computed using algorithm proveIntersection.

If v corresponds to a set union, let P(v) be computed using algorithm proveUnion.

(c) Compute values $b_1, \ldots, b_\delta$ such that $\prod_{i=1}^{\delta}(x_i + s) = \sum_{i=1}^{\delta} b_i s^i$.

The values $b = \{b_1, \ldots, b_\delta\}$ are the coefficients of the characteristic polynomial of set α.

(d) Output $\{\alpha, \Pi = (a_1, \ldots, a_t, \pi_1, \ldots, \pi_t, P(v_1), \ldots, P(v_{|T|-t})), b\}$ Observe that the size of the proof Π is O(t+δ). This follows from the fact that the values $a_i, \pi_i$ are of constant size and each of P(v) is of size linear to the number of children on v. Since each node of T has a unique parent and there are at most t−1 internal nodes at T, the combined size of all proofs P(v) taken together is O(t). Also, there are exactly δ coefficients $b_i$ therefore the total size of Π is O(t+δ).

5. Algorithm $\{accept, reject\} \leftarrow hverify(\alpha, \Pi, q, pk, h)$ Parse proof as $\Pi = (a_1, \ldots, a_t, \pi_1, \ldots, \pi_t, P(v_1), \ldots, P(v_{|T|-t}), b\}$. Proceed as follows:

(a) Verify the validity of the original accumulated values. For each value $a_i$, run the verification algorithm of AT on input $a_i,\pi_i,pk,h$. If it outputs reject for any of them, output reject and halt.

(b) Verify the correctness of all intermediate accumulation values. For each internal node v, run verifyUnion or verifyIntersection accordingly on input P(v). If it outputs reject for any of them, output reject and halt.

(c) Validate the correctness of coefficients b by running algorithm checkCoefficients on input $\alpha,b$. If it outputs reject, output reject and halt.

(d) Verify that the following equality holds:

$$e\left(\prod_{i=1}^{\delta} g^{b_i s^i}, g\right) = e(a_\alpha, g).$$

Observe that $a_\alpha$ is included in $\Pi$ as part of $P(v_{root})$. If the equality holds output accept, otherwise reject.

The runtime of the above verification algorithm is $O(t+\delta)$ as steps 1 & 2 take time $O(t)$ from a similar argument as above and steps 3 & 4 take time $O(\delta)$.

The scheme AHSO$_2$={genkey, setup, hquery, hverify, update, refresh} is a dynamic ADS scheme for queries q from the class of hierarchical set operations queries with proof size and verification time $O(t+\delta)$, where t is the number of sets appearing in q and $\delta$ is the size of the query answer $\alpha$.

Source Operations

Figure 10:
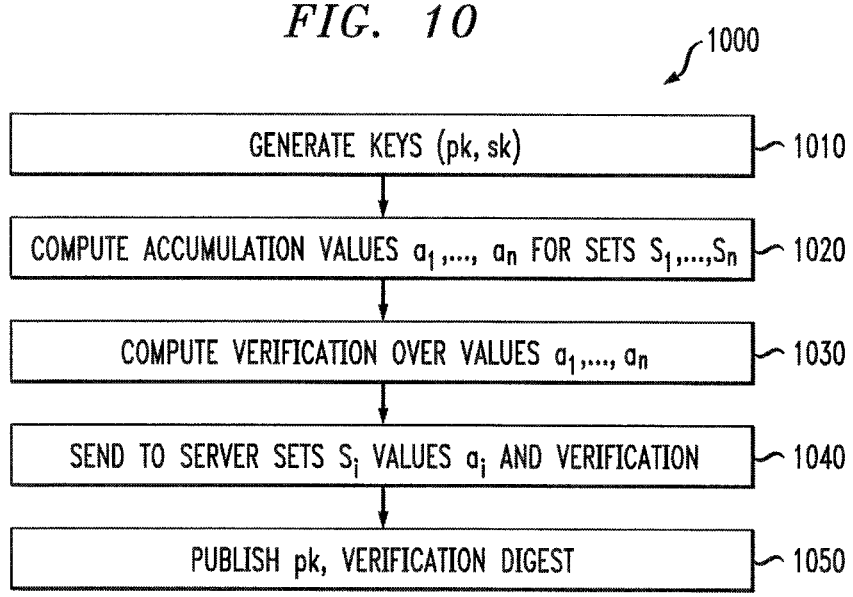
FIG. 10 is a flow chart describing an exemplary implementation of a data set outsourcing process that may be implemented by the source of FIG. 1 or 2.

FIG. 10 is a flow chart describing an exemplary implementation of a data set outsourcing process 1000 that may be implemented by the source 110, 210 of FIG. 1 or 2. As shown in FIG. 10, the source 110, 210 initially generates public and secret keys (pk,sk) during step 1010. Thereafter, the source 110, 210 computes accumulation values $a_1, \ldots, a_n$ for corresponding sets $S_1, \ldots, S_n$ during step 1020.

The source 110, 210 then computes a verification over values $a_1, \ldots, a_n$ during step 1030. The verification may comprise an accumulation tree (AT) or any other public key authentication scheme, such as digital signatures, Merkle Trees and publishing the accumulation values at a (secure) public access repository that is authenticated by the source.

The source 110, 210 then sends the server 120, 220 sets $S_i$, corresponding values $a_i$ and the verification during step 1040.

Finally, the source 110, 210 publishes the public key pk and a verification digest during step 1050.

It is noted that if the verification comprises an accumulation tree (AT), the source 110 computes the AT and corresponding digest, sends them to the server 120 and publishes the digest. The server 120 includes in each proof, accumulation tree proofs-of-membership for each of the accumulation values of the sets involved in the query with respect to AT. The client 130 verifies validity of accumulation values using the public key, the digest and the verification algorithm of AT.

When the verification comprises a Merkle Tree, it is processed in a similar manner by the parties as an AT. There is no need to send the Merkle tree to the server 120, however; since it is a deterministic construction for a chosen hash function and can be re-constructed by the server 120.

When the verification comprises a Digital Signature Scheme, the source 110 computes signatures Sig$_i$ and sends them to the server 120. The source also publishes the public key to the digital signature scheme. For each set involved in a query, the corresponding signature for its accumulation value is included by the server 120 in the proof. The client 130, using the public verification key, verifies the integrity of each accumulation value.

When the verification comprises a Public Access Repository, the source 110 sets up some authentication information for the repository and populates it with accumulation values $a_i$. The source 110 also publishes its certificate. No authentication information is included by the server 120 in the proof regarding accumulation values $a_i$. The client 130 accesses the repository and using the certificate of the source 110 verifies the integrity of values $a_i$ used in the proof.

Server Operations

Figure 11:
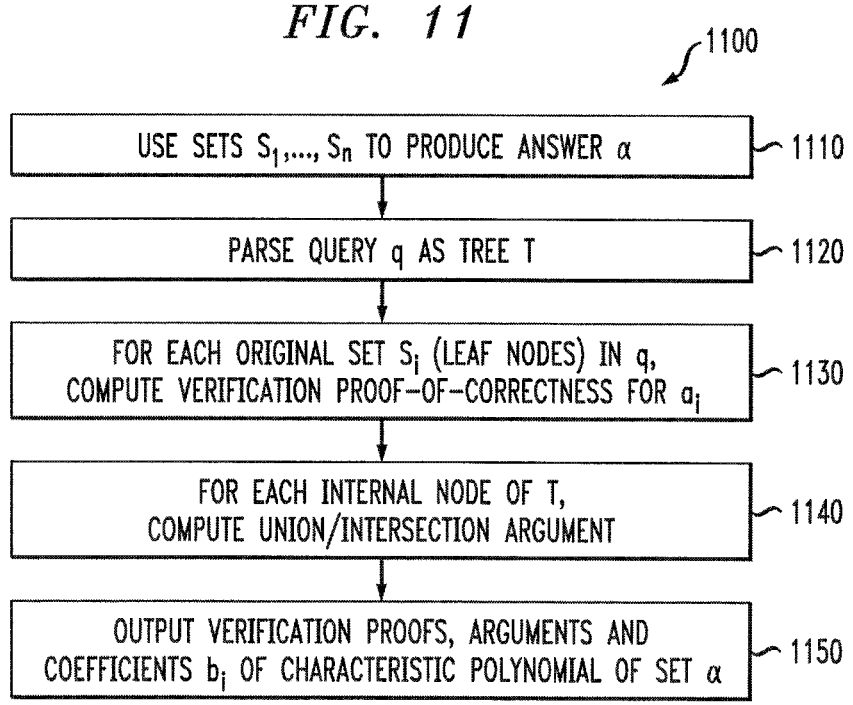
FIG. 11 is a flow chart describing an exemplary implementation of a query answering process that may be implemented by the server of FIG. 1 or 2.

FIG. 11 is a flow chart describing an exemplary implementation of a query answering process 1100 that may be implemented by the server 120, 220 of FIG. 1 or 2. As shown in FIG. 11, the server 120, 220 initially uses the sets $S_1, \ldots, S_n$ to produce an answer $\alpha$ during step 1110, in a conventional manner. The server 120, 220 then parses the query q as a tree T during step 1120.

For each original set $S_i$ in q, the server 120, 220 computes the verification proof-of-correctness for $a_i$ during step 1130 (i.e., for each $a_i$ relevant to the query).

For each internal node of T, the server 120, 220 computes the Union/Intersection argument during step 1140, as discussed above in conjunction with FIGS. 6-9.

The server 120, 220 then outputs the verification proofs (step 1130), arguments (step 1140) and coefficients $b_i$ of the characteristic polynomial of set $\alpha$ during step 1150.

Client Operations

FIG. 12 is a flow chart describing an exemplary implementation of an answer verification process 1200 that may be implemented by the client 130 of FIG. 1. As shown in FIG. 12, for each set $S_i$ in the query q, the client 130 verifies the validity of accumulation value $a_i$ using provided verification proof during step 1210. In addition, for each internal node of T, the client 130 validates the provided Union/Intersection arguments during step 1220, using the verified accumulation value $a_i$.

The client 130 then uses an FFT interpolation to verify the validity of the coefficients $b_i$ of the characteristic polynomial during step 1230. A test is performed during step 1240 to determine if all checks hold. If it is determined during step 1240 that all checks hold, then an acceptance is output during step 1250. If, however, it is determined during step 1240 that all checks do not hold, then a rejection is output during step 1260.

Improvements and Extensions

Reducing Proof Size

The size of proof $\Pi$ can be reduced to being independent of the size of the final answer $\alpha$. Observe that what makes the proof be of size $O(t+\delta)$ is the presence of coefficients b. However, given $\alpha$ itself, coefficients $b=(b_1, \ldots, b_\delta)$ can be computed using an FFT algorithm in time $O(\delta \log \delta)$. Thus, an alternative to the above scheme would be:

Replace proof $\Pi$ with $\Pi'=\{a_1, \ldots, a_t, \pi_1, \ldots, \pi_t, P(v_1), \ldots, P(v_{|T|-t})\}$.

Replace step 3 in the verification algorithm by: polynomial interpolation with FFT compute coefficients b for the characteristic polynomial of set $\alpha$.

The above modifications yield an ADS scheme with similar properties as AHSO$_2$ except that proof size is $O(t)$ and verification time is $O(\delta \log \delta)$. Since, in general, computing $\alpha$ given sets $S_i$ can be done in time $O(\delta)$ (if the final output size is larger than all involved sets, i.e., a "flat"

union query), this scheme is not efficient. However, since in most real world applications, a proof that has size independent of δ is useful, especially if one considers that the additional overhead for verification is logarithmic only.

Reducing Public Key Size

In the exemplary construction, the public key pk is of size linear to the parameter q where q is an upper bound on the size of the sets that can be accumulated. This holds not only for the original sets $S_1, \ldots, S_T$ but for any set that can result from hierarchical set operations among them. A natural lower bound for q is $|S_1 \cup \ldots \cup S_T|$. While computing this public key cannot be avoided and it is necessary for proof computation at the server 120, a client 130 that needs to verify the correctness of query Q with corresponding answer α of size δ, only needs values $g, \ldots, g^{s^\delta}$ and $h, \ldots, h^{s^\delta}$ in order to run algorithm hverify.

To this end, the following modifications can be made to the AHSO₂ scheme:

Algorithm genkey runs the key-generation algorithm of an additional accumulation tree AT' and values pk and sk are defined as $pk=(pk_1,pk_2,pk_3), sk=(sk_1,sk_2,sk_3)$. Following that pk is only shared with the server and not necessarily with the clients.

Let $i=0, \ldots, q$ and $g_i=g^{s^i}$. Algorithm setup runs an extra step, computing accumulation tree digest h' for tree AT' over pairs $(i, g_i)$. Digests h,h' are published.

Algorithm hprove runs an additional step, including in the proof values $g, \ldots, g^{s^\delta}$ and corresponding proofs $p_i$ for proof membership with respect to up to date digest value h' of tree AT'.

Algorithm hverify runs an additional step, validating the correctness of values $g, \ldots, g^{s^\delta}$ with respect to h'.

The above modifications yield a secure ADS scheme for hierarchical set operations with proof size and verification time O(t+δ). Moreover, the public key necessary for the verification is of size O(δ) instead of O(q). The only truly public key of the scheme are digest values h, h' for the accumulation trees of the scheme (which, as before, needs to be kept up to date).

The above procedure can be integrated into any similar scheme that is making use of a q-type assumption in order to reduce the public key size to constant size from O(q). It must be stated that the approach that involves an accumulation tree is not the only one since the elements of the public key are static. For example, one can compute digital signatures using any EU-CMA secure scheme in order to prove the validity of the values in the public key. The corresponding δ signatures would then be included in any proof of correctness and verified accordingly.

Proving Set Difference and Negation

The exemplary construction can be extended to accommodate set differences as well as unions and intersections. In order to facilitate that, assuming trusted accumulation values $a_A, a_B$ for an operation of the form $C=A\backslash B$ the proof would consist of a knowledge accumulation $a_C, \tilde{a}_C$ for set C. Verification can be performed simply by checking the equalities:

$$e(a_C, a_B) = e(a_A, g) \quad (16)$$

$$e(\tilde{a}_C, g) = e(a_C, g^\alpha). \quad (17)$$

For any non-uniform polynomial time adversary A that upon input the public key of an extractable accumulation scheme and sets A,B with accumulation values $a_A, a_B$, outputs proof such that equalities (14)-(15) hold, with overwhelming probability $a_C = acc(C)^\lambda$ for some $\lambda \in Z^*_p$.

As above, this can be extended even when values $a_A, a_B$ are soft cheatings themselves. The above technique can be used in order to provide proofs for the case of set negation in a manner that is, at least theoretically, feasible. The source 110 simply needs to incorporate in the data structure a set S* corresponding to set $S_1 \cup \ldots \cup S_T$ and its corresponding accumulation value that must be inserted in the accumulation tree AT. The client 130 can verify that a set A' is the negation of A (with respect to all elements present at data structure D) by using the above technique for set difference and substituting S* for B.

Set S* and its corresponding accumulation value may potentially need to be updated for every element addition or removal at one of the sets $S_i$ (while at all times $|S^*| \leq q$). The additional overhead of algorithms update and refresh is only constant hence such a modification is not prohibitive. Depending on the context of the scheme (data structure input domain, number of elements per set, number of sets etc.) it may be a better idea to define the element domain of sets $S_1, \ldots, S_T$ as E with $E \subset Z^*_p$ and $|E|$ is of order poly(l) where l is the security parameter of the scheme. This has the advantage that $S^*=\{x|x \in E\}$ and its accumulation value are fixed ahead of time during the setup algorithm. On the other hand, for this approach to be facilitated, q must be chosen ahead of time as $|E|$ possibly adding a significant overhead for genkey and setup. This is more of an implementation choice than a security related concern. One final observation is that such a modification pairs nicely with the previous improvement for reducing the verification key size, essentially sparing the user form the additional cost of the larger public key (unless a query issued by the user calls for a large answer).

A More Lightweight Construction

The use of extractable accumulation schemes in the above construction allows the production of short proofs that are efficiently verifiable. However, it is believed that there is no known attack for the exemplary scheme even if these additional accumulation values are removed. Indeed such an alternative scheme is still provably secure. To achieve this, the exemplary construction is modified accordingly:

Replace the extractable accumulation scheme with a bilinear accumulator.

Replace knowledge accumulations in the proof with regular set accumulation values.

Omit steps (3) in the intersection argument and (8),(9), (14) and (15) in the union argument.

The above changes remove at most t-1 elements from the proof and corresponding t-1 steps from verification, as well as cutting the public key size down by half. All asymptotic notations still hold, but in practice this yields a scheme that is more lightweight for implementation purposes.

Applications

The disclosed constructions can be employed in a wide range of applications and environments where computation related to query answering is performed by an untrusted party.

Authenticated Keyword Search

The prominent application where the exemplary authentication scheme can find use is keyword-search queries implemented by an inverted index data structure. The general flexibility of the exemplary construction allows for elaborate queries consisting of nested set operations while maintaining efficiency thus making it ideal for use in such an environment. Namely, assuming keywords $k_1, \ldots, k_n$ and corresponding sets $S_1, \ldots, S_n$, the exemplary scheme can accommodate queries of the form "Return all documents containing keywords from q" where q can be an elaborate (hierarchical) number of set operations over $S_i$ such as "keyword $k_i$ and/or $k_j$ . . . and/or $k_l$," including even set difference or set negation terms such as "Return all documents with keyword $k_5$ and not $k_{10}$."

The expressive nature of the exemplary construction can accommodate even an extension of the keyword-search problem, namely timestamped keyword-search where an additional dimension is introduced to the problem, namely each document is accompanied by some time period attribute (i.e., time of creation or date of addition to the dataset etc.). In this setting, clients are interested not only in particular keywords, but also in receiving documents that are related with certain time-periods. Assuming time periods $t_1, \ldots, t_m$ in the system, we can define related sets $T_1, \ldots, T_m$. Any elaborate query, such as the previous ones, can now be extended to include set operations involving sets $T_i$ yielding a very expressive query language very closely related to real-world query answering problems, including queries such as "Return all documents with keywords $k_4$ and $k_9$ created at days $t_2$, $t_4$ or $t_5$ without keyword $k_6$." Recall that, for the exemplary efficient construction, the verification of the above query answer would only depend on the answer of the final size (plus the number of involved sets which in this case is 6) and would be entirely independent of the sizes of the original and intermediate sets. Setup time of such a construction would only be linear to the dataset size and the same holds for storage purposes at source and server (there is no need to explicitly store separately sets $S_i, T_i$ since queries are answered using the original datasets. Only their accumulation values should be stored which result in additional storage of one group element per set).

Authenticated SQL Query Answering

Another field where the exemplary schemes can be used is authenticated SQL queries. A wide range of relational algebra operations can be mapped to set operations and our schemes can be adopted to provide efficient verification techniques and proofs. Since, any type of nested set operation consisting of set operations can be accommodated, any SQL query that can be translated to a number of set operations over appropriately defined sets (in the context of a particular implementation) can be handled in a provably secure manner.

Consider relational tables $R_1(r_{11}, \ldots, r_{1n}), \ldots, R_m(r_{m1}, \ldots, r_{mn})$; $R_i, R_j$ are α-compatible if they share a common attribute α. Let $S_{1l}, \ldots, S_{mn}$ denote the sets corresponding to attributes $r_{1l}, \ldots, r_{mn}$ respectively. Without loss of generality, assume that for attributes α so that two tables are α compatible, there are no duplicate values. This can be achieved by maintaining an additional mapping data structure that maps such attribute values to the corresponding database records.

The following operations can be defined over α-compatible tables:

(i) Multiple Equi-Joins Followed by Set Difference or Union. Equi-join queries can be mapped to intersection queries over sets $S_{1\alpha}, \ldots, S_{t\alpha}$. Following that, other meaningful operations can be added such as a set union to receive a corresponding result such as an SQL query (informally written here) "Return the union of $R_1$, $R_2$ joined on α and $R_3$, $R_4$ joined on α." Accommodating such queries may or may not require some additional authenticated data structure (depending on the database context and the types of queries the database owner wants to accommodate). For example a separate number of sets $O_{1l}, \ldots, O_{mn}$ may be required in order to verify the ordering of attribute values in the answer of a projection query.

(ii) General Projection Queries. A projection query (that may span multiple tables) can be seen as a union of an arbitrary number of sets $S_{i1}, \ldots, S_{mn}$ resulting in a new table $R^*$. This can be combined with any other meaningful set operation to accommodate queries of the form "Return a table with columns $r_{ia}, r_{kl}$ except for values contained in $r_{pa}$."

(iii) General Selection Queries. Assuming that each tuple in the database is given a unique numerical id, for each attribute value v in the dataset, the set $R_{ij}^{(v)}$ containing the numerical id's of all tuples that have value v for attribute $r_{ij}$ can be defined. Observe that, while there are numerous such sets, their total number is bounded by the size of the database. Such an encoding allows efficient authenticated answering of queries of the form "Return all tuples from table $R_i$ such that $r_{i3}=50$ and $r_{i5}=3$ or $r_{i2}=$'John'." A slightly more elaborate encoding can be adopted to include inequality checks for the selection query.

In all cases, the content authenticity of tuples contained in the final answer can be achieved in numerous ways, such that defining an accumulation value over each tuple as a set, appropriate use of digital signatures over the tuples, or careful use of hash functions. All of the above examples contain explicitly nested operations in order to exemplify the expressiveness obtained with our constructions. However it should be noted that both of our schemes optionally accommodate the "flat" alternatives, i.e. simple equi-join queries, projections or selections.

It should become obvious from the given examples, that depending on the selection of appropriate original sets from the database, a wide range of SQL queries can be handled and the above examples are only a small characteristic number of approaches. All of the above proposals maintain setup time and storage space linear to the size of the database. It is expected that the disclosed techniques will achieve even easier adoption in scenarios where the type of queries offered to an end-user is somehow structured (e.g., for website forms where predefined fields can be filled with values that correspond to an SQL query in a relational database). This would allow the database owner/manager to select a particular set encoding that would minimize the necessary overhead in order to address that specific type of SQL queries.

In general, the disclosed authentication scheme finds applications in the authentication of general SQL queries, including sophisticated join queries and nested queries of the form SELECT-FROM-WHERE.

Verifying Evaluation of Functions Computable by Polynomial Size Circuits

The disclosed construction for hierarchical set operations can be generalized if an appropriate encoding is considered from binary functions to set operations. Namely, it is shown how to encode boolean circuits including AND, OR and NOT operations, to tree circuits similar to the ones discussed above so that, if a function $f$ is computable by a boolean circuit C, there exists an efficiently constructible circuit TC similar to tree T defined for hierarchical set operations but with potentially multiple output wires, at the output wires of which lies a sequence of accumulation values of 1's or 0's that can be securely mapped to the output of $f(\cdot)$ for any input x.

One way to capture this mapping function is to map the boolean values true, false with sets A,B respectively where $A=\{a\}$ and $B=\cup$, a being an appropriate group element according to our scheme. Then, function OR is captured by set union, and function AND by set intersection. Finally, operation NOT(X) is captured by $\{a\}\setminus X$ The validity of the mapping can be inferred by the following semantic tables.

| X | ¬ X |
|---|---|
| A | B |
| B | A |

| X | Y | X ∪ Y |
|---|---|---|
| A | A | A |
| A | B | A |
| B | A | A |
| B | B | B |
| A | A | A |
| A | B | B |
| B | A | B |
| B | B | B |

Subject to this encoding, any boolean circuit C can be outsourced and evaluated for particular values in a secure way, by mapping boolean values to sets and then applying our construction for hierarchical set operations, with proof size and verification time O(TC)=O(C). The source 110 simply outputs values acc(A),acc(B). A query will generally be of the form $f(\cdot)$ for a polynomial time computable function and x where x comes from the appropriate domain for $f(\cdot)$. For ease of notation, it is assumed that $x_i$ (the i-th bit of x) is the corresponding input to a gate of circuit C and correspondingly a leaf node of TC. The proof is identical as in the hierarchical set operations construction except that no proofs of correctness for the original accumulation values and no knowledge accumulations are necessary. Verification includes a single pass over the accumulation values at the leafs of TC to validate that they correspond to the bit values in x. Following that, for each internal node in TC verification checks that the corresponding equalities hold depending on whether the node corresponds to a union, intersection or set difference. If at any point an accumulation value a* is related to a node (internal, leaf, or output wire) such that $a^* \neq a_A$ and $a^* \neq a_B$ output reject and halt. Finally let the accumulation values related to output wires of C be $o_1, \ldots, o_w$. For i=1, ..., w if $o_i = a_A$ then set $f(x)_i = 1$, otherwise $f(x)_i = 0$ where $f(x)_i$ is the i-th bit of the output. Check answer $\alpha = f(x)$ and accept if the equality holds, otherwise reject.

Conclusion

As previously indicated, the above-described embodiments of the invention are presented by way of illustrative example only. Numerous variations and other alternative embodiments may be used, as noted above. Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed by a third party server for processing a query on a plurality of data sets, wherein said data sets are stored in a memory and outsourced from a source of said data sets, wherein said query comprises a hierarchical set operation between at least two of said data sets, said method comprising:

obtaining, from said source, said data sets, corresponding encoded versions of said data sets, and a verification of said encoded versions;

generating an answer to said query using said data sets, wherein at least one level of a hierarchy of said hierarchical set operation of said query comprises at least a first one of an intersection operation, a union operation and a set difference operation, and wherein at least a second level different from the first level of said hierarchy comprises at least a second distinct one of said intersection operation, said union operation and said set difference operation;

parsing said query as a tree, wherein leaf nodes in said tree correspond to at least two of said data sets associated with said query and non-leaf nodes in said tree correspond to at least one of said intersection operation, said union operation and said set difference operation;

for each leaf node in said tree corresponding to a given data set, computing a verification for an encoded version of said given data set that is based on said obtained encoded versions of said data sets and said obtained verification of said encoded versions;

for each non-leaf node in said tree, computing at least one argument for a corresponding at least one of said intersection operation, said union operation and said set difference operation; and providing an encoded version of said answer and a proof-of-correctness to said client, wherein said proof-of-correctness comprises said computed verification for each leaf node encoding, and said at least one argument for each non-leaf node set operation, wherein said provided encoded version of said answer and said provided proof-of-correctness are used by said client to authenticate said hierarchical set operation.

2. The method of claim 1, wherein said encoded versions of said data sets comprise accumulation values and wherein said encoded version of said answer comprises one or more of said answer and coefficients of a characteristic polynomial of said answer.

3. The method of claim 2, wherein said at least one argument comprises one or more of an intersection argument comprising one or more of subset witnesses, completeness witnesses, and accumulation values and a union argument comprising one or more of subset witnesses, completeness witnesses, and accumulation values.

4. The method of claim 3, wherein said accumulation values of said intersection argument comprise one or more of an accumulation value created by a primary accumulator and an accumulation value created by a secondary accumulator, and wherein accumulation values of said union argument comprise an intersection accumulation value and a union accumulation value created by a primary accumulator, and an intersection accumulation value and a union accumulation value created by a secondary accumulator.

5. The method of claim 3, wherein said union argument for multiple sets comprises a concatenation of union arguments for a plurality of pairs of sets.

6. The method of claim 2, wherein said method employs an extractable accumulator comprising a primary bilinear accumulator and a secondary bilinear accumulator.

7. The method of claim 6, wherein a public key of said secondary bilinear accumulator is created by raising each element in a public key of the primary bilinear accumulator to a secret element and wherein said primary bilinear accumulator generates an accumulation value of data set and wherein said secondary bilinear accumulator generates an accumulation value of said given data set.

8. The method of claim 2, wherein said coefficients for the characteristic polynomial of the answer are computed using a polynomial interpolation.

9. The method of claim 1, wherein said method is employed by one or more of an authenticated keyword search, an authenticated SQL query answer, and a construction for verifying an evaluation of a function computable by polynomial size circuits.

10. The method of claim 1, wherein said step of computing said at least one argument for at least one set operation corresponding to a non-leaf node in said tree is based on at least two of said computed verification for the encoded versions of all leaf nodes that are descendants of said node in said tree and said computed at least one argument for at least one set operation corresponding to all children nodes of said node in said tree.

11. The method of claim 1, wherein said source performs the following steps prior to said third party server processing said query:

generating a public key and a secret key;
computing encoded versions of said data sets;
obtaining a verification of said encodings;
providing said data sets said corresponding computed encoded versions and said obtained verification of said encodings to said third party server; and
publishing said public key and a digest of said verification.

12. The method of claim 11, wherein said obtained verification comprises one or more of a publication of said encodings and a digital signature, an accumulation tree and a Merkle tree computed over said encodings.

13. A non-transitory machine-readable recordable storage medium for processing a query on a plurality of data sets stored in a memory and outsourced from a source of said data sets, wherein one or more software programs when executed by one or more processing devices implement the steps of the method of claim 1.

14. A third party server apparatus for processing a query on a plurality of data sets, wherein said data sets are stored in a memory and outsourced from a source of said data sets, wherein said query comprises a hierarchical set operation between at least two of said data sets, the apparatus comprising:

a memory; and
at least one hardware device, coupled to the memory, operative to implement the following steps:
obtaining, from said source, said data sets, corresponding encoded versions of said data sets, and a verification of said encoded versions;
generating an answer to said query using said data sets, wherein at least one level of a hierarchy of said hierarchical set operation of said query comprises at least a first one of an intersection operation, a union operation and a set difference operation and wherein at least a second level different from the first level of said hierarchy comprises at least a second distinct one of said intersection operation, said union operation and said set difference operation;

parsing said query as a tree, wherein leaf nodes in said tree correspond to at least two of said data sets associated with said query and non-leaf nodes in said tree correspond to at least one of said intersection operation, said union operation and said set difference operation;

for each leaf node in said tree corresponding to a given data set, computing a verification for an encoded version of said given data set that is based on said obtained encoded versions of said data sets and said obtained verification of said encoded versions;

for each non-leaf node in said tree, computing at least one argument for a corresponding at least one of said intersection operation, said union operation and said set difference operation; and providing an encoded version of said answer and a proof-of-correctness to said client, wherein said proof-of-correctness comprises said computed verification for each leaf node encoded version, and said at least one argument for each non-leaf node set operation, wherein said provided encoded version of said answer and said provided proof-of-correctness are used by said client to authenticate said hierarchical set operation.

15. A method performed by a client for verifying a query on a plurality of data sets, wherein said data sets are stored in a memory of a server and outsourced from a source of said data sets, wherein said query is performed by said server, wherein said query comprises a hierarchical set operation between at least two of said data sets, said method comprising:

receiving from said server an encoded version of an answer to said query and a proof-of-correctness, wherein at least one level of a hierarchy of said hierarchical set operation comprises at least a first one of an intersection operation, a union operation and a set difference operation and wherein at least a second level different from the first level of said hierarchy comprises at least a second distinct one of said intersection operation, said union operation and said set difference operation, wherein said proof-of-correctness comprises a verification for at least two encoded versions of one or more of said data sets associated with said query and at least one argument for at least one of said intersection operation, said union operation and said set difference operation, wherein said received encoded version of said answer and said received proof-of-correctness are used by said client to authenticate said hierarchical set operation;

parsing said received proof-of-correctness as a tree, wherein leaf nodes in said tree correspond to at least two of said data sets associated with said query and non-leaf nodes in said tree correspond to at least one of said intersection operation, said union operation and said set difference operation;

for each leaf node in said tree corresponding to a given data set, deriving and verifying a corresponding encoded version of said given data set using said corresponding received verification;

for each non-leaf node in said tree, verifying said received at least one argument for a corresponding at least one of said intersection operation, said union operation and said set difference operation using said verified at least two encoded versions;

for the root node in said tree, verifying said received encoded version of an answer to said query using said verified at least two encoded versions; and accepting said answer if said verifying steps for all nodes in said tree are correct.

16. The method of claim 15, wherein said encoded versions of said data sets comprise accumulation values and wherein said encoded version of said answer comprises one or more of said answer and coefficients of a characteristic polynomial of said answer.

17. The method of claim 16, wherein said at least one argument comprises one or more of an intersection argument comprising one or more of subset witnesses, completeness witnesses, and accumulation values and a union argument comprising one or more of subset witnesses, completeness witnesses, and accumulation values.

18. The method of claim 17, wherein said accumulation values of said intersection argument comprise one or more of an accumulation value created by a primary accumulator and an accumulation value created by a secondary accumulator, and wherein accumulation values of said union argument comprise an intersection accumulation value and a union accumulation value created by a primary accumulator, and an intersection accumulation value and a union accumulation value created by a secondary accumulator.

19. The method of claim 17, wherein said union argument for multiple sets comprises a concatenation of union arguments for a plurality of pairs of sets.

20. The method of claim 16, wherein said method employs an extractable accumulator comprising a primary bilinear accumulator and a secondary bilinear accumulator.

21. The method of claim 15, wherein said method is employed by one or more of an authenticated keyword search, an authenticated SQL query answer, and a construction for verifying an evaluation of a function computable by polynomial size circuits.

22. The method of claim 15, wherein said received verification comprises one or more of a publication of said encoded versions and a digital signature, an accumulation tree and a Merkle tree computed over said encoded versions.

23. The method of claim 15, wherein said step of verifying said received at least one argument for at least one set operation corresponding to a non-leaf node in said tree is based on at least two of said received verification for the encoded versions of all leaf nodes that are descendants of said node in said tree and said received and verified at least one argument for at least one set operation corresponding to all children nodes of said node in said tree.

24. The method of claim 15, wherein said client verifies said at least two leaf node encoded versions of said data sets associated with said query with respect to a digest of said corresponding received verification.

25. A non-transitory machine-readable recordable storage medium for verifying a query on a plurality of data sets stored in a memory and outsourced from a source of said data sets, wherein said query is performed by a server, wherein one or more software programs when executed by one or more processing devices implement the steps of the method of claim 15.

26. A client apparatus for verifying a query on a plurality of data sets, wherein said data sets are stored in a memory of a server and outsourced from a source of said data sets, wherein said query is performed by said server, wherein said query comprises a hierarchical set operation between at least two of said data sets, the apparatus comprising:

a memory; and at least one hardware device, coupled to the memory, operative to implement the following steps:

receiving from said server an encoded version of an answer to said query and a proof-of-correctness, wherein at least one level of a hierarchy of said hierarchical set operation comprises at least a first one of an intersection operation, a union operation and a set difference operation and wherein at least a second level different from the first level of said hierarchy comprises at least a second distinct one of said intersection operation, said union operation and said set difference operation, wherein said proof-of-correctness comprises a verification for at least two encoded versions of one or more of said data sets associated with said query and at least one argument for at least one of said intersection operation, said union operation and said set difference operation, wherein said received encoded version of said answer and said received proof-of-correctness are used by said client to authenticate said hierarchical set operation;

parsing said received proof-of-correctness as a tree, wherein leaf nodes in said tree correspond to at least two of said data sets associated with said query and non-leaf nodes in said tree correspond to at least one of said intersection operation, said union operation and said set difference operation;

for each leaf node in said tree corresponding to a given data set, deriving and verifying a corresponding encoded version of said given data set using said corresponding received verification;

for each non-leaf node in said tree, verifying said received at least one argument for a corresponding at least one of said intersection operation, said union operation and said set difference operation using said verified at least two encoded versions;

for the root node in said tree, verifying said received encoded version of an answer to said query using said verified at least two encoded versions; and accepting said answer if said verifying steps for all nodes in said tree are correct.

* * * * *

UNITED STATES PATENT AND TRADEMARK OFFICE
CERTIFICATE OF CORRECTION

PATENT NO. : 9,465,874 B1
APPLICATION NO. : 14/696606
DATED : October 11, 2016
INVENTOR(S) : Papadopoulos et al.

Page 1 of 1

It is certified that error appears in the above-identified patent and that said Letters Patent is hereby corrected as shown below:

In the Specification

In Column 4, Line 10, replace "parameters) of the" with --parameters of) the--.

In Column 5, Line 58, replace "$f(l)<1/(poly(l)$" with --$f(l)<1/(poly(l))$--.

In Column 7, Line 5, replace "{Dh+1, auth($D_{h+1}$)$d_{h+1}$}" with --{$D_{h+1}$, auth($D_{h+1}$)$d_{h+1}$}--.

In Column 7, Line 48, replace "Finally the" with --Finally, the--.

In Column 10, Line 31, replace "In a n-level operation" with --In an n-level operation--.

In Column 10, Line 49, replace "set itself) to P(q)" with --set itself) to P(q).--.

In Column 10, Line 57, replace "in table ACC" with --in table ACC.--.

In Column 15, Line 5, replace "(in addition access" with --(in addition, access--.

In Column 17, Line 48, replace "L)" with --L)).--.

In Column 22, Line 14, replace "constant hence such" with --constant, hence such--.

Signed and Sealed this
Seventh Day of February, 2017

Michelle K. Lee
*Director of the United States Patent and Trademark Office*